United States Patent
Han et al.

(10) Patent No.: US 12,556,709 B2
(45) Date of Patent: Feb. 17, 2026

(54) MOTION SEARCH FOR REFERENCE BLOCK SELECTION

(71) Applicant: QUALCOMM Incorporated, San Diego, CA (US)

(72) Inventors: Yu Han, San Diego, CA (US); Vladan Andrijanic, San Diego, CA (US); Wei-Jung Chien, San Diego, CA (US); Cheng-Teh Hsieh, Del Mar, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 221 days.

(21) Appl. No.: 17/934,508

(22) Filed: Sep. 22, 2022

(65) Prior Publication Data

US 2024/0107023 A1    Mar. 28, 2024

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/139* (2014.11); *H04N 19/156* (2014.11); *H04N 19/167* (2014.11); *H04N 19/172* (2014.11); *H04N 19/176* (2014.11); *H04N 19/436* (2014.11); *H04N 19/52* (2014.11)

(58) Field of Classification Search
CPC .. H04N 19/105; H04N 19/139; H04N 19/172; H04N 19/176; H04N 19/52
See application file for complete search history.

(56) References Cited

U.S. PATENT DOCUMENTS

2011/0150091 A1   6/2011   Young
2012/0147962 A1   6/2012   Kim et al.
(Continued)

FOREIGN PATENT DOCUMENTS

CN   113489987 A   10/2021

OTHER PUBLICATIONS

Machine Translation of CN 113489987 A, obtained from https://worldwide.espacenet.com/ (Year: 2021).*
(Continued)

*Primary Examiner* — Kyle M Lotfi
(74) *Attorney, Agent, or Firm* — Shumaker & Sieffert, P.A.

(57) ABSTRACT

A method of encoding video data includes determining an integer sample in a reference picture of the video data; determining, based on the integer sample, at least a first fractional sample and a second fractional sample, wherein the first fractional sample has a first fractional pel resolution, and the second fractional sample has a second fractional pel resolution different from the first fractional pel resolution; subsequent to determining both the first fractional sample and the second fractional sample, determining a first cost metric associated with the first fractional sample and a second cost metric associated with the second fractional sample; determining a reference block for a current block based on at least one of the first cost metric or the second cost metric; and encoding the current block based on the reference block.

24 Claims, 9 Drawing Sheets

(51) Int. Cl.
*H04N 19/139* (2014.01)
*H04N 19/156* (2014.01)
*H04N 19/167* (2014.01)
*H04N 19/172* (2014.01)
*H04N 19/176* (2014.01)
*H04N 19/436* (2014.01)
*H04N 19/52* (2014.01)

(56) References Cited

U.S. PATENT DOCUMENTS

| | | |
|---|---|---|
| 2015/0382009 A1 | 12/2015 | Chen et al. |
| 2018/0098089 A1 | 4/2018 | Chen et al. |
| 2019/0261018 A1 | 8/2019 | Bordes et al. |
| 2022/0167001 A1 | 5/2022 | Zhang et al. |

OTHER PUBLICATIONS

Huang et al., "Highly Parallel Fraction Motion Estimation Engine for Super Hi-Vision 4k x 4k @60fps," System LSI Lab, IPS, Waseda University N355, 2-7, Hibikino, Wakamatsu, Kitakyushu, Fukuoka, 808-0135, Japan. MMSP'09, Oct. 5-7, 2009, Rio de Janeiro, Brazil. (Year: 2009).*

International Search Report and Written Opinion—PCT/US2023/032513—ISA/EPO—Dec. 5, 2023 (12 pp).

Sotetsumoto T., et al., "Low Complexity Algorithm for Sub-pixel Motion Estimation of HEVC", 2013 IEEE International Conference on Signal Processing, Communication and Computing (ICSPCC 2013), Aug. 1, 2013, 4 Pages, XP055252933, Sections II.III, Figures 2, 3.

Ta N.T., et al., "High Performance Fractional Motion Estimation in h.264/avc Based on One-step Algorithm and 8x4 Element Block Processing", Signal Processing. Image Communication, Elsevier Science Publishers, Amsterdam, NL, vol. 26, No. 2, Dec. 20, 2010, pp. 85-92, XP028148224, Section 3.1.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668.

* cited by examiner

MOTION SEARCH FOR REFERENCE BLOCK SELECTION

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for a fractional search to identify the samples to be used for generating a reference block. For instance, a video encoder may identify an integer sample. The video encoder may determine for which fractional samples of a plurality of fractional samples to determine respective cost metrics. One example of a cost metric is a distortion value (e.g., indicative of difference between a reference blocks that includes the fractional sample and a current block). As an example, the video encoder may determine, based on the integer sample, at least a first fractional sample and a second fractional sample (e.g., that are used to determine respective cost metrics). For instance, the video encoder may identify a set of fractional samples of a plurality of fractional samples for which to determine respective cost metrics, where the set of fractional samples includes the first fractional sample and the second fractional sample.

The determined fractional samples (e.g., the set of fractional samples) include samples having different fractional pel resolutions. For example, the first fractional sample has a first fractional pel resolution and the second fractional samples has a second fractional pel resolution different from the first fractional pel resolution. As an example, the first fractional sample has a half-pel resolution, and the second fractional samples has a quarter-pel resolution.

Subsequent to determining all of the fractional samples for which to determine the respective cost metrics, the video encoder may determine the respective cost metrics (e.g., in one stage). For instance, subsequent to determining both the first fractional sample and the second fractional sample, the video encoder may determine a first cost metric associated with the first fractional sample and a second cost metric associated with the second fractional sample. That is, the video encoder may determine the respective cost metrics for both half-pel and quarter-pel samples in the same stage, as compared to other techniques, in which the video encoder generates cost metrics for the half-pel samples, followed by the cost metrics for the quarter-pel samples around the best half-pel sample. Based on the evaluation, the video encoder may determine a motion vector for the current block and a reference block for the current block.

In one or more examples, the example techniques may be considered as a single (i.e., one) stage fractional search because the fractional search includes samples at different resolutions, as compared to iterative techniques, in which samples at different resolutions are iteratively searched. By determining all fractional samples for which to determine the respective cost metrics, including fractional samples having different resolutions (e.g., identifying the first and second fractional samples having different fractional pel resolutions), and then determining the cost metrics, the processing time needed to determine a motion vector and a reference block for the current block may be reduced, as compared to techniques that iteratively determine cost metrics.

In one example, a method of encoding video data comprises: determining an integer sample in a reference picture of the video data; determining, based on the integer sample, at least a first fractional sample and a second fractional sample, wherein the first fractional sample has a first fractional pel resolution, and the second fractional sample has a second fractional pel resolution different from the first fractional pel resolution; subsequent to determining both the first fractional sample and the second fractional sample, determining a first cost metric associated with the first fractional sample and a second cost metric associated with the second fractional sample; determining a reference block for a current block based on at least one of the first cost metric or the second cost metric; and encoding the current block based on the reference block.

In another example, a device for encoding video data includes memory configured to store video data; and one or more processors implemented in circuitry, coupled to the memory, and configured to: determine an integer sample in a reference picture of the video data; determine, based on the integer sample, at least a first fractional sample and a second fractional sample, wherein the first fractional sample has a first fractional pel resolution, and the second fractional sample has a second fractional pel resolution different from the first fractional pel resolution; subsequent to determining both the first fractional sample and the second fractional sample, determine a first cost metric associated with the first fractional sample and a second cost metric associated with the second fractional sample; determine a reference block for a current block based on at least one of the first cost metric or the second cost metric; and encode the current block based on the reference block.

In another example, a computer-readable storage medium stores instructions thereon that when executed cause one or more processors to: determine an integer sample in a reference picture of the video data; determine, based on the integer sample, at least a first fractional sample and a second fractional sample, wherein the first fractional sample has a first fractional pel resolution, and the second fractional sample has a second fractional pel resolution different from the first fractional pel resolution; subsequent to determining both the first fractional sample and the second fractional sample, determine a first cost metric associated with the first fractional sample and a second cost metric associated with the second fractional sample; determine a reference block for a current block based on at least one of the first cost metric or the second cost metric; and encode the current block based on the reference block.

In another example, a device for encoding video data comprises: means for determining an integer sample in a reference picture of the video data; means for determining, based on the integer sample, at least a first fractional sample and a second fractional sample, wherein the first fractional sample has a first fractional pel resolution, and the second fractional sample has a second fractional pel resolution different from the first fractional pel resolution; means for, subsequent to determining both the first fractional sample and the second fractional sample, determining a first cost metric associated with the first fractional sample and a second cost metric associated with the second fractional sample; means for determining a reference block for a current block based on at least one of the first cost metric or the second cost metric; and means for encoding the current block based on the reference block.

The details of one or more examples are set forth in the accompanying drawings and the description below. Other features, objects, and advantages will be apparent from the description, drawings, and claims.

DETAILED DESCRIPTION

Figure 1:
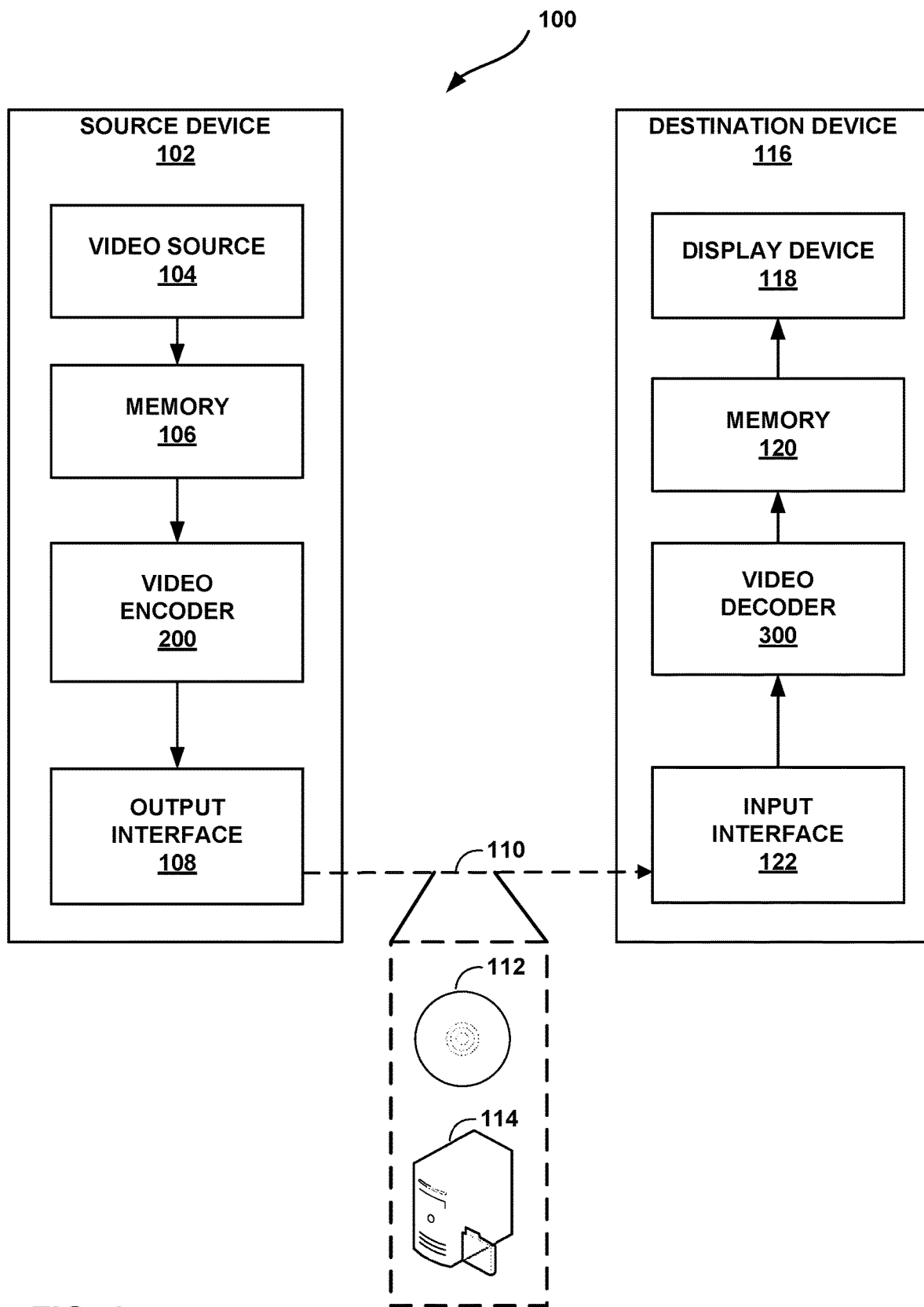
FIG. 1 is a block diagram illustrating an example video encoding and decoding system that may perform the techniques of this disclosure.

One example video coding technique is inter-prediction. In inter-prediction, a video encoder determines a motion vector for a current block being encoded. The motion vector identifies a set of samples in a reference picture. The video encoder uses the set of samples to generate a reference block for the current block, and a prediction block from the reference bock. The video encoder subtracts the prediction block from the current block to generate residual values. The video encoder signals information indicative of the residual values and information used to determine the motion vector that a video decoder receives. The video decoder generates the prediction bock and the reference block based on the motion vector and adds the residual values to the prediction block to reconstruct the current block.

This disclosure describes example techniques to determine which set of samples may be used for generating a reference block for the current block. Techniques to determine which set of samples to use for generating a reference block is referred to as a motion search. In general, a motion search refers to identifying a set of samples that form a block that are closest in value to the current block.

The samples used to generate the reference block may be integer samples or fractional samples. An integer sample may be a sample that is already present in the reference picture. A fractional sample may be a sample that is not present in the reference picture, but is generated by the video encoder using samples present in the reference picture. As an example, a half-pel sample is a sample between two samples already present in the reference picture that the video encoder uses to interpolate the half-pel sample. Fractional samples may be referred to as being at different fractional pel resolutions.

In the present disclosure, a fractional sample is termed to have a specific fractional pel resolution if the sample grid with the specific fractional pel resolution is the coarsest grid on which the fractional sample can be found. For example, a quarter-pel sample can be found on a quarter-pel grid but may not be found on a half-pel grid. In other words, fractional pel grids according to the present disclosure may be mutually disjoint. A fractional sample may belong to exactly one fractional pel grid. The set of all fractional samples at a specific fractional pel resolution does not include any sample at a different fractional pel resolution. Likewise, no set of fractional samples includes any integer sample.

In accordance with one or more examples described in this disclosure, the video encoder may generate samples having different pel resolutions. For instance, the video encoder may generate samples having half-pel resolution, quarter-pel resolution, and/or samples at other resolutions. The video encoder may then evaluate samples having the different resolutions. For example, the video encoder may determine for which fractional samples of a plurality of fractional samples to determine respective cost metrics. That is, the video encoder may identify a set of fractional samples of a plurality of fractional samples for which to determine respective cost metrics.

One example of cost metrics include distortion values. This disclosure describes examples with respect to "distortion values" for ease. However, distortion values are one example of cost metrics, and the techniques should not be considered limited to "distortion" values. That is, the cost metric may be indicative of distortion, but the example techniques should not be considered limited to requiring that a cost metric be indicative of a distortion.

The video encoder may determine at least a first fractional sample and a second fractional sample (e.g., that are used to determine respective cost metrics, such as distortion values). In this example, the first fractional sample and the second fractional sample are samples from the set of fractional samples of the plurality of fractional samples that the video encoder identified. In this example, the determined fractional samples (e.g., the set of fractional samples) include at least a first fractional sample having a first fractional pel resolution and a second fractional sample having a second fractional pel resolution, where the first fractional pel resolution is different than the second fractional pel resolution.

Subsequent to determining all of the fractional samples for which to determine the respective cost metrics, the video encoder may determine a respective cost metric associated with each of the determined fractional samples (e.g., the set of fractional samples). For example, subsequent to determining both the first fractional sample and the second fractional sample, the video encoder may determine a first cost metric (e.g., a first distortion value) associated with the first fractional sample and a second cost metric (e.g., a second distortion value) associated with the second fractional sample.

Evaluating samples (e.g., determining cost metrics of samples) having different resolutions may mean that the video encoder generates a candidate reference block based on each of the samples. For instance, a first candidate reference block is based on a first sample, a second candidate reference block is based on a second sample, and so forth. The first sample and the second sample may be samples having different resolutions (e.g., the first sample is an integer sample, and the second sample is a half-pel sample, or the first sample is a half-pel sample, and the second sample is a quarter-pel sample). The video encoder may determine respective cost metrics indicative of a difference between each of the candidate reference blocks and a block (e.g., a current block being encoded or some other block, such as a previously decoded block or block based on decoded video data). For example, the cost metrics (e.g., distortion values) may be sum of absolute difference (SAD) values or sum of absolute transformed difference (SATD) values between the samples in the candidate reference blocks and the block. The video encoder may generate a reference block from the candidate reference block having the smallest distortion (e.g., candidate reference block having smallest cost metric with respect to the block).

For instance, the video encoder may determine a cost metric (e.g., distortion value), from among the respective cost metrics, indicative of a lowest distortion amount with respect to the block among the determined cost metrics. The video encoder may determine a candidate reference block associated with the determined cost metric, determine the reference block based on the determined candidate reference block. For example, the video encoder may set the reference block equal to the determined candidate reference block associated with the cost metric indicative of the lowest distortion amount with respective to current block.

Accordingly, in one or more examples, a video encoder may be configured to perform a motion search refinement in a single stage of sample generation. A stage of sample generation (or simply a stage), as used in this disclosure, refers to the video encoder determining (e.g., identifying, computing, selecting, deriving, etc.) for which fractional samples to determine respective distortion values as part of the motion search. For instance, the determined fractional samples may define candidate reference blocks (e.g., top-left samples of candidate reference blocks) that the video encoder evaluates as part of the motion search. The distortion values generated in the single (i.e., one) stage may be for respective candidate reference blocks having the samples with different fractional resolution that are identified by respective motion vectors for the candidate reference blocks. In other words, in accordance with the current disclosure, the distortion values associated with candidate reference blocks having different fractional resolution may be determined, by the video encoder, concurrently, such as in parallel (e.g., at the same time or overlapping in time). The above and following is described with respect to distortion values, which are examples of cost metrics.

For instance, in some existing techniques, the video encoder selects a motion vector by first evaluating integer samples (e.g., samples that are actually present without interpolation) in a reference picture to identify an integer sample that results in the least error (e.g., lowest distortion) if used to generate a reference block. In a first stage, the video encoder determines distortion values of half-pel samples (e.g., interpolated samples between the integer samples) around the identified integer sample, to identify the best half-pel sample (e.g., that results in lowest distortion if used to generate a reference block). In a second stage, the video encoder determines distortion values of quarter-pel samples (e.g., interpolated samples between the half-pel samples) around identified half-pel samples, to identify the best quarter-pel sample. The video encoder then generates a reference block based on the identified best quarter-pel sample.

Existing techniques for motion search (refinement) are iterative and difficult for a hardware to perform with a degree of parallelism. For instance, a video encoder cannot begin the quarter-pel search until all of the half-pel samples are evaluated. That is, video encoder first determines distortion values for the half-pel samples, and cannot determine for which quarter-pel samples to determine distortion values until after evaluating the distortion values for the half-pel samples.

Some example prior techniques are multi-stage techniques with respect to fractional sample evaluation, in which the video encoder evaluates only half-pel samples (e.g., determines and compares distortion values), in a first stage, and then evaluates quarter-pel samples in the next stage. For instance, in the first stage, the video encoder determines distortion values for half-pel samples, and does not determine distortion values for quarter-pel samples until a second stage. Then, in these existing techniques, the video encoder performs another stage in which the video encoder determines distortion values for more samples (e.g., quarter-pel samples).

This disclosure describes examples of determining for which fractional samples of a plurality of fractional samples to determine respective distortion values based on the integer sample. For instance, example techniques include determining a set of fractional samples of a plurality of fractional samples for which to determine respective distortion values. The determined fractional samples (e.g., the set of fractional samples) include at least a first fractional sample having a first fractional pel resolution and a second fractional sample having a second fractional pel resolution, wherein the first fractional pel resolution is different than the second fractional pel resolution. Accordingly, the example techniques include determining, based on the integer sample, at least a first fractional sample and a second fractional sample (e.g., of the set of fractional samples) that are used to determine respective distortion values, where the first fractional sample and the second fractional sample have different fractional pel resolutions.

Subsequent to determining all of the fractional samples for which to determine the respective distortion values, the techniques include determining the respective distortion values based on the determined fractional samples (e.g., the set of fractional samples). For instance, the example techniques include subsequent to determining both the first fractional sample and the second fractional sample, determining the respective distortion values associated with the first fractional sample and the second fractional sample.

In some examples, by first determining all of the fractional samples for which respective distortion values are to be determined, and then determining the respective distortion values, the example techniques may promote a single stage motion search refinement to identify the sample to be used for generating a reference block. As one example, the video encoder may determine for which fractional samples of the plurality of fractional samples to determine respective distortion values in one stage (e.g., identify the first fractional sample and the second fraction sample having different fractional pel resolutions in one stage). Stated another way, the video encoder may identify all of the fractional samples for which distortion values are to be determined in one stage. In other techniques, the video encoder determines some of the fractional samples for which distortion values are to be determined in a first stage, determines and evaluates the distortion values, and then in a second stage, identifies for which additional fractional samples to determine distortion values.

For instance, a video encoder may identify the best integer sample (e.g., having lowest distortion), and generate fractional samples at different resolutions (e.g., generate both half-pel and quarter-pel samples) around the identified integer sample. The video encoder may then determine for which of these fractional samples to determine distortion values and evaluate (e.g., determine distortion values) in one stage. A stage may refer to video encoder determining for which fractional samples of a plurality of fractional samples to determine respective distortion values. In some examples, the stage may include the determination of the respective distortion values for the determined fractional samples. The determined fractional samples for which the video encoder may determine distortion values may form the top-left samples of a candidate reference block used for the distortion value calculation and may be identified by a motion vector. In this way, the video encoder may determine (e.g., identify) at least a first fractional sample and a second fractional sample that are used to determine respective distortion values, where the first fractional sample and the second fractional sample have different fractional pel resolutions.

That is, the video encoder may identify both half-pel and quarter-pel samples, e.g., around the integer sample, for which distortion values are to be determined in the same stage, as compared to other techniques, in which the video encoder first determined the half-pel samples around the best integer sample in one stage, followed by the quarter-pel samples around the best half-pel sample in another stage. For instance, in one or more examples, the video encoder may determine (e.g., identify) all of the samples that are to be evaluated including samples at different pel resolutions, and after all of the samples are determined (e.g., identified), the video encoder may evaluate the samples (e.g., such as by generating candidate reference blocks and determining distortion values).

In one or more examples, the video encoder may determine the distortion values partially or completely in parallel (e.g., at the same time or overlapping in time). As an example, the video encoder may determine a first distortion value based on a first fractional sample having a first fractional pel resolution, and determine a second distortion value based on a second fractional sample having a second, different fractional pel resolution in parallel with determining the first distortion value.

In this manner, the example techniques may promote coding efficiency because the video encoder need not wait to complete evaluating samples at one resolution before determining distortion values for samples at other resolutions. For instance, in the multi-stage motion search (refinement), there is dependency and delay for hardware implementation. As one example, for multi-stage motion search, the video encoder, in a first stage, completes evaluating samples (e.g., determining and comparing distortion values for samples) at one resolution to identify the best sample, and then, in a second stage, evaluates samples at a different resolution around the identified best sample. In one or more examples, with the single stage motion search (refinement), the video encoder may first generate distortion values of all the samples, and then compare the distortion values, allowing the video encoder to complete evaluation of all samples without needing to wait to complete evaluating samples at one resolution before generating distortion values for samples at other resolutions.

For instance, the video encoder may determine distortion values partially or completely in parallel for all samples for which distortion values are to be determined. In some other techniques, the video encoder cannot generate distortion values for all samples in one stage. Rather, the video encoder needs to wait to determine for which samples having lower-pel resolution to determine distortion values until the video encoder has completed the determination of distortion values for samples having higher-pel resolution. For example, the video encoder may not be able to determine distortion values for samples having quarter-pel resolution until after determining distortion values and comparing distortion values for samples having half-pel resolution.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for motion search for reference block selection. The examples for motion search for motion reference block selection is described with respect to video encoder 200. However, in one or more examples, video decoder 300 may perform similar operations as part of decoder side motion derivation.

Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for motion search for reference block selection. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device.

A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use motion search, such as for inter-prediction, as described in more detail.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute differences (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

As described in more detail, this disclosure describes example techniques of a motion search for reference block selection. Video encoder 200 may be configured to perform the example techniques and determine a reference block. In some examples, video decoder 300 may perform the example techniques and determine a reference block as part of decoder side derivation technique. For ease, the examples are described with respect to video encoder 200.

Also, the term "reference block" and "prediction block" may be interchangeable. However, the reference block and the prediction block may be different in some cases. For instance, the reference block may include a plurality of samples, and the plurality of samples may be filtered, offset, clipped, etc. to generate the prediction block.

In some examples, the reference block may include samples directly from a reference picture (e.g., the samples are actual samples within the reference picture). Such samples are referred to as integer samples. In some examples, the reference block may include fractional samples. Fractional samples refer to samples that are generated based on integer samples within the reference picture. For instance, video encoder 200 may interpolate (e.g., average) two integer samples to generate a sample that hypothetically resides between the two integer samples. As another example, video encoder 200 may perform a weighted average of the two integer samples to generate additional samples between the two integer samples (e.g., such as three samples between the two integer samples). Interpolation is one example way to generate fractional samples, but there may be others that may be used with the techniques of this disclosure.

Fractional samples may be referred to as samples having different fractional pel resolutions. For instance, half-pel refers to having a hypothetical sample between two integer samples in the same row or column, quarter-pel refers to having three hypothetical samples between two integer samples in the same row or column, and so forth. Because these additional fractional samples increase the resolution of a picture, the fractional samples may therefore be at different fractional pel resolutions.

In accordance with one or more examples described in this disclosure, video encoder 200 may be configured to determine for which fractional samples of a plurality of fractional samples to determine respective cost metrics, where the fractional samples include fractional samples having different resolutions. Examples of the cost metrics include distortion values. In this disclosure, examples are described with distortion values for ease, but the techniques should not be considered limited to values that are indicative of distortion. Rather, the example techniques are based on a cost metric. The cost metric may be based on samples between candidate reference blocks and a current block, and may be indicative of distortion but does not have to be indicative of distortion.

For example, video encoder 200 may be configured to determine a first fractional sample and a second fractional sample (e.g., that are used to determine respective distortion values), where the first fractional sample has a first fractional pel resolution, and the second fractional sample has a second fractional pel resolution different than the first fractional pel resolution. For instance, video encoder 200 may determine a first cost metric associated with the first fractional sample, and a second cost metric associated with the second fractional sample.

Video encoder 200 may generate candidate reference blocks from which video encoder 200 selects the reference block. In this disclosure, "fractional samples having different resolutions" means that the fractional samples include at least the first fractional sample having a first fractional pel resolution and the second fractional sample having a second, different fractional pel resolution.

As one example, the first fractional pel resolution may be half-pel, quarter-pel, eighth-pel, sixteenth-pel, thirty-second-pel, or sixty-fourth pel. The second fractional pel resolution may be another one of half-pel, quarter-pel, eighth-pel, sixteenth-pel, thirty-second-pel, or sixty-fourth pel, as a few examples. A half-pel fractional resolution means that there is one interpolated sample between two integer samples vertically, horizontally, and diagonally. A quarter-pel fractional resolution means that there are three interpolated samples between two integer samples vertically, horizontally, and diagonally, and so forth. In other words, a half-pel fractional resolution grid has a step size of half a pixel/integer sample and a quarter-pel fractional resolution grid has a step size of a quarter of a pixel/integer sample, and so forth.

As one example, video encoder 200 may determine an integer sample in a reference picture based on a search area. An example of the search area is described in more detail with respect to FIG. 2. As an example, video encoder 200 may utilize a motion vector of a neighboring block to the current block as an initial motion vector. Video encoder 200 may determine an integer sample in the reference picture that the initial motion vector identifies. If the initial motion vector does not have integer resolution, video encoder 200 may clip the initial motion vector to have integer resolution so that the clipped initial motion vector identifies an integer sample in the reference picture.

Video encoder 200 may determine a plurality of integer samples within a search area (of the reference picture), and evaluate each of the plurality of integer samples. For example, video encoder 200 may generate candidate reference blocks having integer samples. For instance, for a first integer sample, video encoder 200 may generate a first candidate reference block having integer samples, and for a second integer sample, video encoder 200 may generate a second candidate reference block having integer samples. To identify each of the integer samples and the candidate reference block, video encoder 200 may utilize respective motion vectors. For example, a first motion vector identifies the first integer sample, and the first integer sample is the top-left sample of the first candidate reference block of integer samples. A second motion vector identifies the second integer sample, and the second integer sample is the top-left sample of the second candidate reference block having integer samples, and so forth.

Video encoder 200 may compare each of the candidate reference blocks to the current block. As one example of comparing each of the candidate reference blocks to the current block, video encoder 200 may determine cost metrics between each of the candidate reference blocks and the current block. Examples of calculating the cost metrics may be based on sum of absolute differences (SAD) or sum of absolute transformed differences (SATD). For SATD, video encoder 200 may transform each of the candidate reference blocks (e.g., using Hadamard transform, discrete cosine transform (DCT), etc.) and the current block, and determine a SAD from the resulting transforms. Video encoder 200 may be configured to calculate the cost metrics using other techniques. As described, the cost metrics may be indicative of distortion values, and the example techniques may describe video encoder 200 determining distortion values. Distortion values are an example of cost metrics.

Video encoder 200 may determine the candidate reference block having the smallest distortion value compared to all other candidate reference blocks. The candidate reference block having the smallest distortion value may be referred to as the "best" candidate reference block having integer samples, and the motion vector that identified the best candidate reference block having integer samples may be referred to as the "best" motion vector. Also, the integer sample that the best motion vector identifies (e.g., the top-left sample in the best candidate reference block) may be referred to as the "best" integer sample. It is understood that rules may be defined for selecting the "best" motion vector in case of multiple candidate reference blocks having the same smallest distortion value, e.g., the reference block whose top-left sample is the first (in the reference picture) in scanning order or the like.

In accordance with one or more examples described in this disclosure, after determining the integer sample in the reference picture within a search area (e.g., the best integer sample), video encoder 200 may determine for which fractional samples of a plurality of fractional samples to determine respective cost metrics based on the integer sample. That is, video encoder 200 may determine a set of fractional samples of a plurality of fractional samples for which to determine respective cost metrics. The determined fractional samples (e.g., set of fractional samples) include at least a first fractional sample having a first fractional pel resolution and a second fractional sample having a second fractional pel resolution. The first fractional pel resolution is different than the second fractional pel resolution. Stated another way, video encoder 200 may determine, based on the integer sample, at least a first fractional sample and a second fractional sample (e.g., that are used to determine respective cost metrics).

As one example, video encoder 200 may determine an integer sample from among the integer samples that neighbor the determined integer sample associated with a lowest distortion value. In one or more examples, a neighboring integer sample may mean that there are no other integer samples between two neighboring integer samples.

For instance, while video encoder 200 was determining the "best" integer sample (e.g., the candidate reference block of integer samples having the lowest distortion value, where the best integer sample is the top-left sample), video encoder 200 may have determined the distortion values for each of the neighboring integer samples using similar techniques as those described above. In other words, in some examples, the distortion values associated with "best" integer sample and the distortion values associated with the neighboring integer samples may already be stored in memory (e.g., memory 106 or some other memory video encoder 200) while video encoder 200 determined the "best" integer sample. Video encoder 200 may access the memory to determine the sample from the neighboring integer samples having the lowest distortion value (referred to herein as the "best" neighboring integer sample). In this way, video encoder 200 may be able to reuse already determined information, which can promote efficient processing.

Video encoder 200 may determine the fractional samples for which to determine the distortion values such that the fractional samples are biased towards the neighboring integer sample having the lowest distortion value. For example, assume the "best" integer sample is the first integer sample, and the neighboring integer sample having the lowest distortion value is the second integer sample. In this example, the set consisting of the determined fractional samples, for which distortion values are to be determined, may be "biased" toward the second integer sample as, for instance, illustrated in FIGS. 3A-C. Accordingly, the determined fractional samples, for which distortion values are to be determined, may be based on locations of the first integer sample and the second integer sample in the reference picture. For instance, video encoder 200 may determine the first fractional sample and the second fractional sample that are used to determine the respective distortion values based on locations of the first integer sample and the second integer sample in the reference picture.

Generally, in the present disclosure, a set of samples, e.g., the set of determined fractional samples or the set of determined fractional samples plus the determined integer sample (e.g., integer sample 152A in FIG. 3A), may be termed "biased" towards a neighboring integer sample (e.g., the second integer sample 154A in FIG. 3A) if the geometric center (i.e., centroid) of all samples of the set lies on the (e.g., diagonal) connection line of the determined integer sample and the neighboring integer sample. Similarly, a set of samples may be termed "biased" toward a first neighboring integer sample and a second neighboring integer sample (which itself is a neighboring integer sample of the first neighboring integer sample) if the geometric center of all samples of the set lies within the pie slice/circular segment formed by the connection lines of the determined integer sample with the respective first and second neighboring integer samples, but not on any of the connection lines themselves.

In the above example, video encoder 200 may determine a second integer sample in the reference picture. The first integer sample and the second integer sample may neighbor one another in the reference picture, and no other integer sample may be between the first integer sample and the second integer sample in the reference picture. In such examples, video encoder 200 may determine the fractional samples for which to determine the respective distortion values based on locations of the first integer sample and the second integer sample in the reference picture. That is, video encoder 200 may determine the first fractional sample and the second fractional sample based on locations of the first integer sample and the second integer sample. For instance, a set consisting of the fractional samples, for which distortion values are to be determined, may be biased toward the second integer sample. Stated another way, the first integer sample and the second integer sample may define a region that is between the first integer sample and the second integer sample, and a majority of the fractional samples, for which video encoder 200 determines distortion values, may be within the defined region.

As described above, to determine the first integer sample (e.g., "best" integer sample) and the second integer sample (e.g., "best" neighboring sample), video encoder 200 may determine respective distortion values associated with respective ones of a plurality of integer samples, where the plurality of the integer samples includes the first integer sample and the second integer sample. Video encoder 200 may store the respective distortion values for comparison. For instance, video encoder 200 may determine that the first integer sample is an integer sample associated with the lowest distortion value, and that the second integer sample is an integer sample among integer samples that neighbor the first integer sample associated with the lowest distortion value.

In the above examples, video encoder 200 may determine for which fractional samples to determine the respective distortion values based on locations of the first integer sample and the second integer sample. Also, the examples are described with respect to distortion values, which are examples of cost metrics. However, the example techniques are not so limited.

As another example, video encoder 200 may determine fractional samples that are centered around the determined integer sample (e.g., the first integer sample or the "best" integer sample). For example, to determine at least the first fractional sample and the second fractional sample, video encoder 200 may identify a set of fractional samples that are used to determine the respective distortion values, where the set of fractional samples include the first fractional sample and the second fractional sample. In this example, video encoder 200 may identify the set of fractional samples as a set of fractional samples centered around the integer sample.

As another example, video encoder 200 may determine the fractional samples starting from fractional samples proximate to the determined integer sample and adding fractional samples with successively increasing distance from the integer sample until a number of fractional samples is equal to a defined number of fractional samples. As an example, to determine at least the first fractional sample and the second fractional sample, video encoder 200 may identify a set of fractional samples that are used to determine the respective distortion values, where the set of fractional samples include the first fractional sample and the second fractional sample. Video encoder 200 may identify the set of fractional samples starting from fractional samples proximate to the integer sample until a number of the fractional samples is equal to a defined number of fractional samples. In other words, the video encoder 200 may determine a set of fractional samples with a defined size of the set, starting with fractional samples most proximate to the determined integer sample and successively filling up the set with fractional samples at increasing distances from the determined integer sample. Eligible fractional samples for inclusion in the set of fractional samples may have to fulfill one or more (geometric) constraints, e.g., the above described bias toward the best neighboring integer sample, a defined order, such as a scan order, a stencil shape (e.g., square, diamond, etc.), or the like.

For instance, the number of fractional samples (the size of the set of fractional samples) that video encoder 200 determines (e.g., via interpolation or some other technique) may be defined by a parameter numFracPoints. The parameter numFracPoints may be defined as M×N, where in some examples M and N are each equal to 5. However, the definition of numFracPoints is provided as one example, and should not be considered limiting. In some examples, numFracPoints includes the determined integer sample.

In general, the number of fractional samples that video encoder 200 generates for the motion search may be based on the hardware capabilities of video encoder 200, and may be a design choice. For instance, if video encoder 200 includes 25 hardware search engine circuits that can run in parallel to perform the operations of the motion search, the number of fractional samples may be 25. That is, as an example, the number of fractional samples that video encoder 200 generates for the motion search may be equal to the number of hardware search engine circuits that can run in parallel to perform the operations of the motion search. The number of fractional samples that video encoder 200 determines being based on the number of search engine circuits is provided as one example and should not be considered limiting. The parameter numFracPoints may be determined by the video encoder 200 based on a number of available hardware search engine circuits or pre-defined as a fixed value, such as 25.

By performing the example techniques described in this disclosure, it may be possible to maximize parallel operation of the hardware search engines to complete the motion search in relatively shorter amount of time. For instance, if there are 25 fractional samples for which to determine distortion values, and there are 25 hardware search engines, it may be possible for each of hardware search engines to run in parallel (e.g., at same time or overlapping in time) to determine the distortion values. In other techniques as previously mentioned, where not all of the fractional samples for which to determine distortion values are known at the same time, some of the hardware search engines may remain idle and are not in use until after distortion values for some of the fractional samples is determined.

Accordingly, in some examples, video encoder 200 may determine each of respective cost metrics (e.g., distortion values) based on the determined fractional samples (e.g., the fractional samples for which distortion values are to be determined) in parallel. Stated another way, the determined fractional samples include at least a first fractional sample having a first fractional pel resolution and a second fractional sample having a second fractional pel resolution, where the first fractional pel resolution is different than the second fractional pel resolution. In one or more examples, video encoder 200 may determine a first cost metric (e.g., first distortion value) based on the first fractional sample having the first fractional pel resolution, and determine a second cost metric (e.g., second distortion value) based on the second fractional sample having the second fractional pel resolution in parallel with determining the first distortion value.

There may be benefits of the example techniques even where the number of hardware search engines is less than the number of fractional samples for which distortion values are to be determined. Even in such examples, the hardware search engines may be operating in parallel, and not waiting on completion of determining distortion values for fractional samples having one resolution before determining distortion values for fractional samples having another, different resolution.

The above describes examples of which fractional samples to determine (e.g., identify) for motion search. As described above, the fractional samples include at least a first fractional sample having a first fractional pel resolution and a second fractional sample having a second fractional pel resolution, where the first fractional pel resolution is different than the second fractional pel resolution. After video encoder 200 determines all of the fractional samples for which to determine the respective distortion values, including samples having different fractional pel resolutions, video encoder 200 may determine distortion values based on the determined fractional samples. For example, subsequent to determining (e.g., identifying, computing, selecting, deriving, etc.) both the first fractional sample and the second fractional sample, video encoder 200 may determine the respective distortion values associated with the first fractional sample and the second fractional sample.

For example, video encoder 200 may generate a plurality of candidate reference blocks based on the determined fractional samples, where each of the plurality of candidate reference blocks is generated based on a respective fractional sample of the plurality of fractional samples. In this case, the candidate reference blocks may include fractional samples (i.e., candidate reference blocks having fractional samples). For instance, a first fractional sample may be the top-left sample of a first candidate reference block having fractional samples, a second fractional samples may be the top-left sample of a second candidate reference block having fractional samples, and so forth. In some examples, video encoder 200 may identify each of the candidate reference blocks having fractional samples based on a respective motion vector from the current block (e.g., a first motion vector for the first candidate reference block, a second motion vector for the second candidate reference block, and so forth). The candidate reference blocks include fractional samples at a single fractional pel resolution. The step sizes between neighboring samples of a candidate reference block in the horizontal and vertical directions are always an integer sample. In other words, a candidate reference block having quarter-pel fractional samples corresponds to an integer sample candidate reference block shifted by a quarter pel from an integer sample motion vector.

Video encoder 200 may compare each of the plurality of candidate reference blocks to the current block. For example, video encoder 200 may perform an SAD or SATD operation between each of the candidate reference blocks and the current block, as examples of the comparison. Video encoder 200 may determine the respective distortion values based on the comparison (e.g., the result of the SAD or SATD may be the respective distortion values).

In one or more examples, video encoder 200 may determine a reference block for the current block based on at least one of the respective distortion values, and, possibly, a distortion value for the above described determined integer sample. For example, video encoder 200 may determine which of the candidate reference blocks (including the candidate reference block corresponding to the determined integer sample) has the least distortion relative to the current block (e.g., smallest distortion value). Video encoder 200 may select the determined candidate reference block as the reference block for the current block. Video encoder 200 may also determine the motion vector associated with the determined candidate reference block. Video encoder 200 may set the motion vector for the current block based on the determined motion vector associated with the determined candidate reference block.

Stated another way, video encoder 200 may determine a distortion value, from among the respective distortion values and the distortion value for the candidate reference block corresponding to the determined integer sample, indicative of a lowest distortion amount with respect to the current block. Video encoder 200 may determine a candidate reference block associated with the determined distortion value. Video encoder 200 may determine the reference block based on the determined candidate reference block. As one example, video encoder 200 may set the reference block equal to the determined candidate reference block.

Video encoder 200 may be configured to encode the current block based on the reference block. As one example, video encoder 200 may generate a prediction block based on the reference block. The prediction block may be equal to the reference block, or video encoder 200 may perform some scaling or other modification of the reference block to generate the prediction block.

Video encoder 200 may determine residual information indicative of a difference between the current block and the prediction block. Also, as described above, video encoder 200 may determine a motion vector for the current block based on the reference block (e.g., the motion vector used to identify the reference block is set equal to the motion vector for the current block). Video encoder 200 may signal information indicative of the residual information and information that video decoder 300 uses to derive the motion vector for the current block. For example, video encoder 200 may determine the difference between the initial motion vector (e.g., used to generate a search area for the motion search) and the determined motion vector, and signal information indicative of the difference, also referred to as a motion vector difference (MVD), as a refinement to the initial motion vector. Video decoder 300 may then reconstruct the current block by generating the prediction block based on the motion vector and summing the residual information with the prediction block.

The example techniques described in this disclosure may allow video encoder 200 to determine the fractional samples for which distortion values are to be determined for motion search in one stage, and possibly determining the distortion values in the one stage. A stage, as used in this disclosure, refers to the combination of operations needed to determine for which fractional samples to determine distortion values, where each of the fractional samples is a sample of a candidate reference block. For instance, in a single stage, video encoder 200 may determine a set of fractional samples that are used to determine respective distortion values. That is, in a single stage, video encoder 200 may determine a set of fractional samples for which respective distortion values are to be determined.

A determined (e.g., identified) fractional sample may be the top-left sample of the candidate reference block that is pointed to by the motion vector for the candidate reference block. As an example, video encoder 200 may determine all of the fractional samples for which to determine the distortion values in one stage, and only utilize those determined fractional samples for the motion search.

Each of the fractional samples, determined in the single stage, may refer to the top-left sample of respective candidate reference blocks. However, the plurality of fractional samples that video encoder 200 determines in a single stage may be the fractional samples of respective candidate reference blocks that are pointed to by the motion vectors of the respective candidate reference blocks. There may be no additional fractional samples that form the sample to which the motion vector points other than the fractional samples that video encoder 200 determined in the single stage of fractional sample determination.

As described above, video encoder 200 may be able to determine the distortion values in parallel, which can reduce processing time. For instance, video encoder 200 need not wait until the completion of determining distortion values for one fractional sample before starting the determination of distortion values of another fractional sample. Video encoder 200 need not wait until completion of determining a distortion value for a candidate reference block from one fractional sample having one fractional resolution before starting the determination of a distortion value for another candidate reference block from another fractional sample having a different fractional resolution.

In some other techniques, video encoder 200 may have utilized multi-stages to determine the fractional samples for which distortion values are determined. For instance, in these other techniques, video encoder 200 may determine the "best" integer sample similar to the above description. After determining the "best" integer sample, video encoder 200 may determine half-pel fractional samples (e.g., in the first stage, video encoder 200 determines half-pel fractional samples) centered around the best integer sample. Video encoder 200 may then determine distortion values, as described above, to determine a best half-pel fractional sample. For example, video encoder 200 may search (e.g., determine distortion values for) the eight half-pel fractional samples around the integer sample to determine the best half-pel fractional sample. Then, in a second stage, video encoder 200 may determine quarter-pel fractional samples centered around the best half-pel fractional sample, determine distortion values for (e.g., search) the eight quarter-pel fractional samples around the best half-pel fractional sample, and then determine a reference block based on the distortion values determined for the best integer sample, the best half-pel fractional sample, and the best quarter-pel fractional sample.

In the above example conventional technique, the fractional search part includes two stages. The first stage to determine the half-pel fractional samples, and the second stage to determine the quarter-pel fractional samples. The quarter-pel fractional sample search cannot start until video encoder 200 finishes the half-pel fractional sample search, where a search refers to the determination and comparison of the distortion values. Accordingly, there is dependency and delay in when video encoder 200 can start generating and evaluating distortion values.

In one or more examples, video encoder 200 may combine the half-pel fractional sample search and the quarter-pel fractional sample search into one stage. That is, rather than piecewise determining half-pel fractional samples and quarter-pel fractional samples in different stages (e.g., video encoder 200 does not determine quarter-pel fractional samples until after distortion values associated with half-pel fractional samples are evaluated), video encoder 200 may determine for which fractional samples of a plurality of fractional samples to determine distortion values (e.g., determine a set of fractional samples), where the determined fractional samples (e.g., the set of fractional samples) include at least a first fractional sample having a first fractional pel resolution and a second fractional sample having a second fractional pel resolution. To determine the fractional samples for which to determine the distortion values, video encoder 200 may identify the fractional samples for which video encoder 200 is to determine distortion values, and may then determine the distortion values for the identified fractional samples.

Accordingly, video encoder 200 may identify all of the fractional samples that video encoder 200 is to use for the motion search (refinement) in one stage (e.g., determine all of the fractional samples that will be top-left samples of corresponding reference blocks in one stage). Subsequent to determining the fractional samples (e.g., subsequent to generating or identifying of all of the fractional samples including fractional samples having different fractional pel resolutions), video encoder 200 may determine respective distortion values based on the determined fractional samples. In general, with a single stage implementation, video encoder 200 may determine the fractional samples that form the top-left samples of respective candidate reference blocks without needing to complete generating other fractional samples. For instance, in one or more examples, video encoder 200 may not wait until evaluating half-pel fractional samples before evaluating quarter-pel fractional samples.

The above examples are described with respect to half-pel and quarter-pel fractional samples. However, the techniques are not so limited. For instance, to determine the plurality of fractional samples, video encoder 200 may determine one or more of half-pel samples, quarter-pel samples, eighth-pel samples, sixteenth-pel samples, thirty-second-pel samples, or sixty-fourth-pel samples, as a few examples.

In addition to performing inter-prediction using the example techniques described above, video encoder 200 may be configured to perform other encoding techniques, such as affine motion compensation and intra-prediction, described below. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
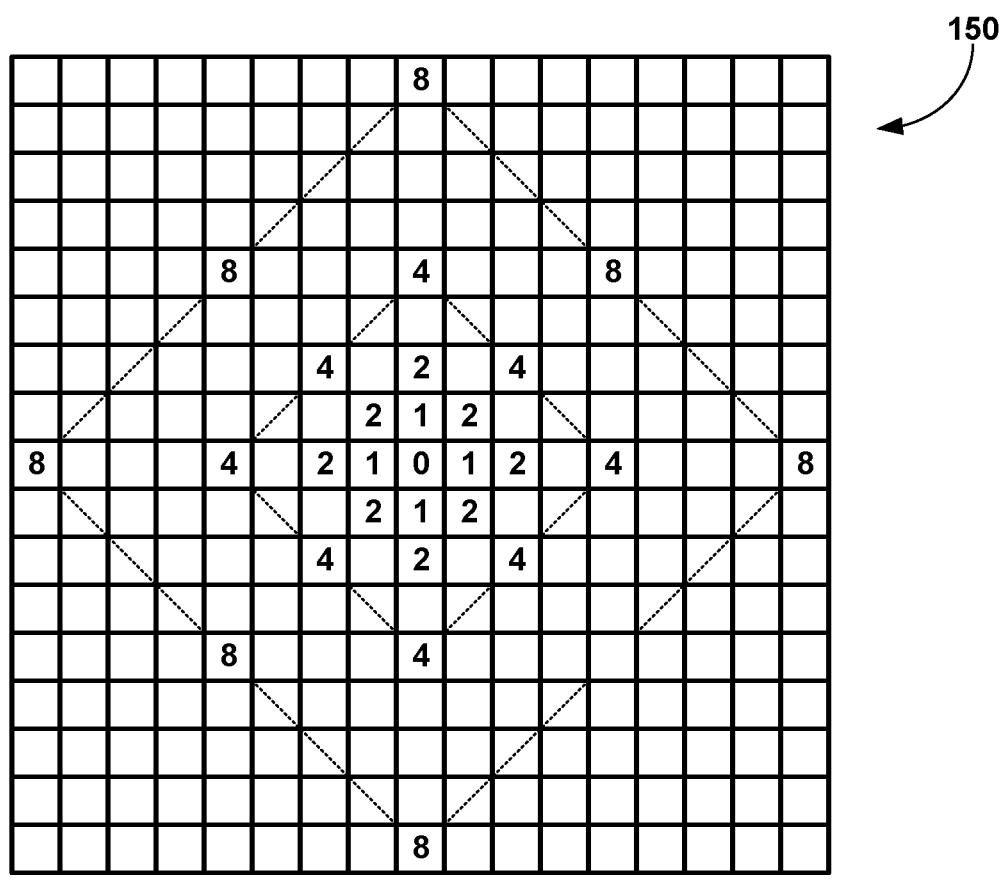
FIG. 2 is a conceptual diagram illustrating an example of a search area for an integer sample.

FIG. 2 is a conceptual diagram illustrating an example of a search area for an integer sample. The search area of FIG. 2 is provided merely as one example and should not be considered limiting. In general, the entire area within a reference picture, or any area within the reference picture may be the search area. In some examples, video encoder 200 may determine the integer sample from a different kind of integer motion search algorithms such as a down sampling search, M×N integer search, etc.

Video encoder 200 may utilize the search area, and the diamond search pattern illustrated by dashed lines in FIG. 2, to determine a "best" integer sample and/or best integer sample motion vector (MV). As described above, the best integer sample may refer to the integer sample that forms the top-left integer sample of a candidate reference block of integer samples having the lowest distortion value. The best integer sample MV refers to the motion vector used to identify this candidate reference block of integer samples having the lowest distortion value.

Video encoder 200 may start with the integer sample in the "0" position. As one example, video encoder 200 may select a motion vector of a neighboring block, and use that motion vector as the initial motion vector that identifies the integer sample in the "0" position. If the initial motion vector is not an integer motion vector (e.g., does not identify an integer sample), video encoder 200 may clip the initial motion vector to identify an integer sample. There may be various ways in which to determine the integer sample in the "0" position, and the use of the motion vector of the neighboring block is one example. As other examples, the integer sample in the "0" position may be co-located with the top-left sample in the current block.

Video encoder 200 may generate a candidate reference block of integer samples for the integer sample in the "0" position, and determine a distortion value with the current block. Video encoder 200 may perform similar operations with the integer samples labeled in the "1" positions (most proximate to the "0" position), samples labeled in the "2" positions (most proximate to the "1" positions), samples labeled in the "4" positions, and samples labeled in the "8" positions. The "1" positions, the "2" positions, the "4" positions, and the "8" positions are position numbers that indicate the L1 (or taxicab) distance from the integer sample at the "0" position. For instance, the integer samples in the "1" positions are one sample away from the integer sample in the "0" position, the integer samples in the "2" positions are two samples away from the integer sample in the "0" position, and so forth.

In one or more examples, based on the respective distortion values of the candidate reference blocks of integer samples, video encoder 200 may determine the candidate reference block of integer samples having the smallest distortion relative to the current block. Video encoder 200 may determine the integer sample used to generate the determined candidate reference block as the "best" integer sample. For instance, the best motion vector may identify the best integer sample. After determining the best integer sample, video encoder 200 may determine fractional samples (e.g., in one, single stage) that video encoder 200 may further evaluate to determine the reference block for the current block used for inter-prediction.

Figure 3A:
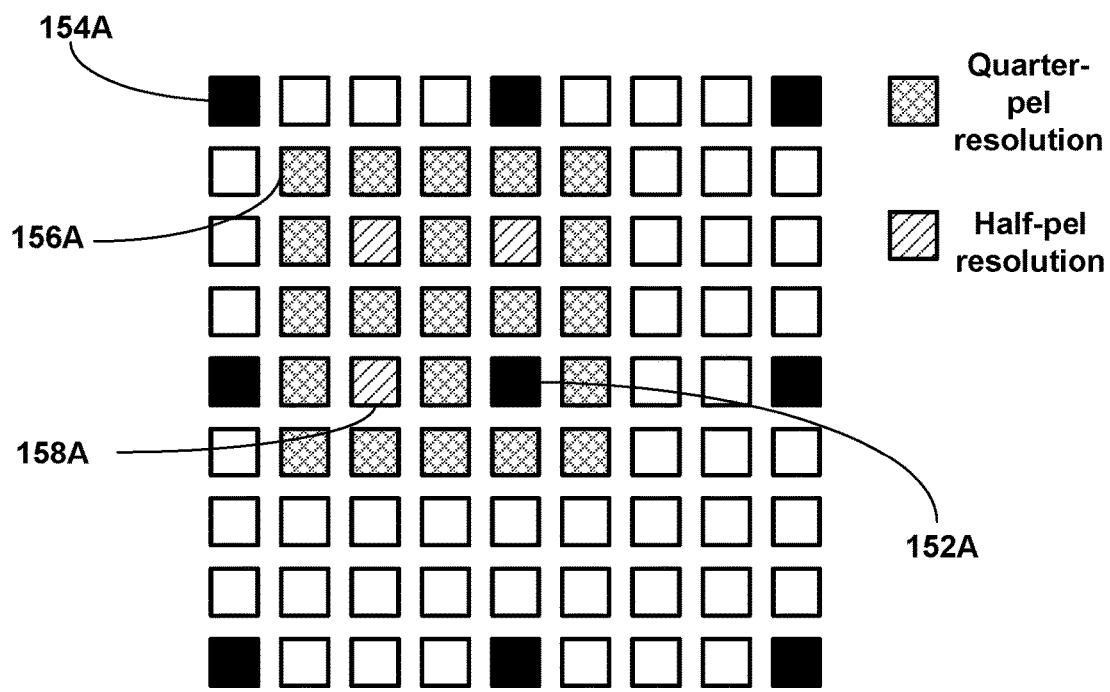
FIGS. 3A-3C are conceptual diagrams illustrating examples of fractional samples that are evaluated for selecting a reference block.
Figure 3B:
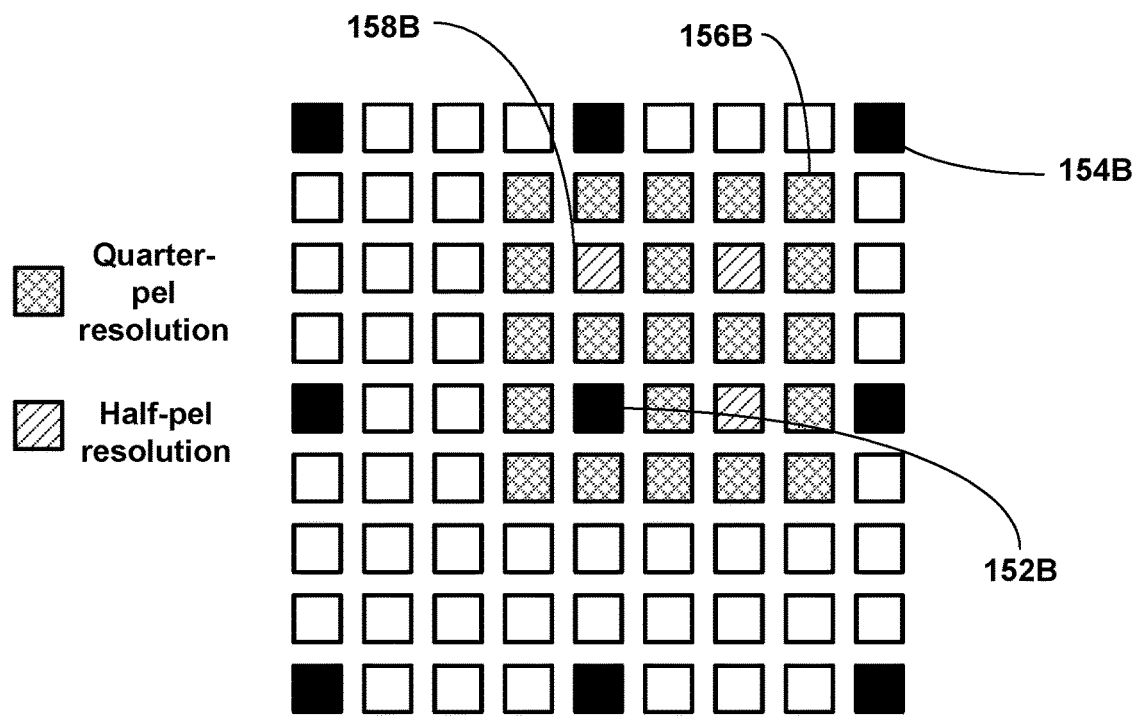
Figure 3C:
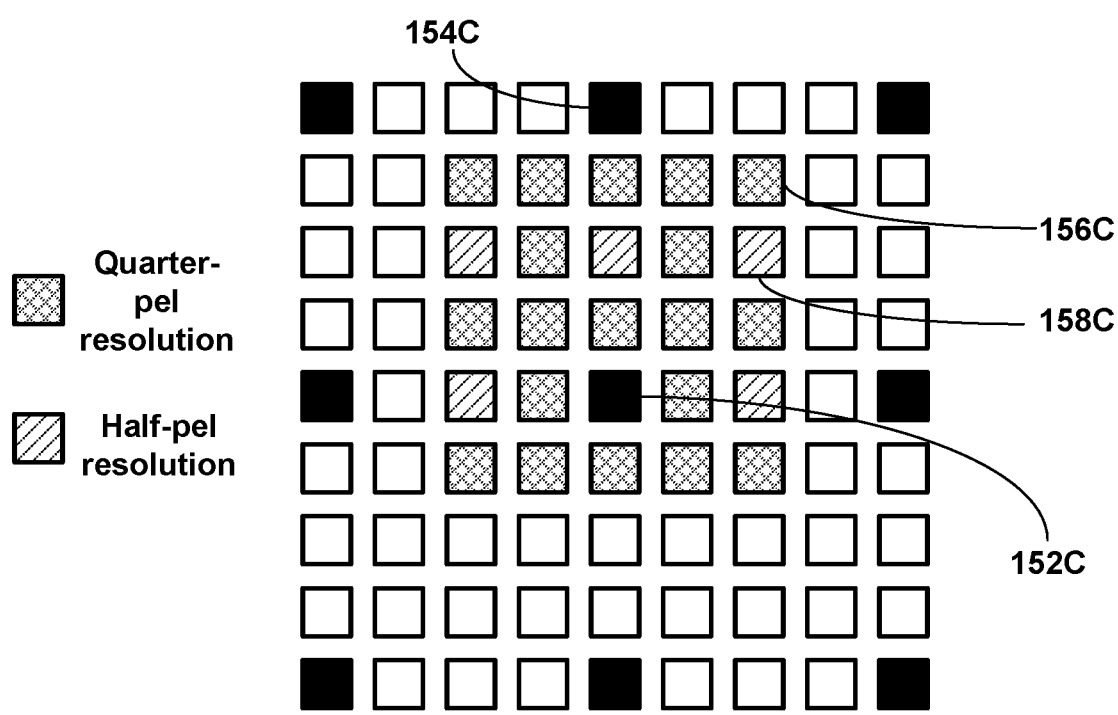

FIGS. 3A-3C are conceptual diagrams illustrating examples of fractional samples that are evaluated for selecting a reference block. In FIGS. 3A-3C, the samples that are black represent integer samples of a reference picture. All other samples represent fractional samples. The fractional samples shown with hashes or diagonal lines are examples of fractional samples that video encoder 200 determined as fractional samples for which respective distortion values are to be determined. Stated another way, video encoder 200 may identify fractional samples (e.g., in one stage) for which distortion values are to be determined, and FIGS. 3A-3C illustrate the determined fractional samples with hashes or diagonal lines. In the example of FIGS. 3A-3C, there is at least a first fractional sample and a second fractional sample, where the first fractional sample and the second fractional sample have different fractional pel resolutions.

In FIG. 3A, video encoder 200 may have determined that integer sample 152A is the "best" integer sample. That is, as part of performing the operations of FIG. 2, video encoder 200 may have determined that a candidate reference block of integer samples has a lowest distortion relative to the current block, and the top-left sample of the candidate reference block is integer sample 152A. Video encoder 200 may have similarly determined integer sample 152B and integer sample 152C as the "best" integer samples in FIGS. 3B and 3C.

Assuming integer sample 152A is a first integer sample, video encoder 200 may determine a second integer sample (e.g., integer sample 154A) in the reference picture (e.g., same reference picture as integer sample 152A), e.g., as the "best" neighboring integer sample as described above. To determine the fractional samples (e.g., those shown in hashes or diagonal lines) from the plurality of fractional samples, video encoder 200 may determine the fractional samples based on locations of the first integer sample 152A and the second integer sample 154A in the reference picture. That is, to determine for which fractional samples of the plurality of fractional samples to determine respective distortion values, video encoder 200 may determine the fractional samples for which to determine the respective distortion values based on locations of the first integer sample and the second integer sample in the reference picture. Stated another way, to determine a set of fractional samples for which to determine respective distortion values, video encoder 200 may determine the set of fractional samples for which to determine the respective distortion values based on locations of the first integer sample and the second integer sample. The set of fractional sample for which distortion values are to be determined may be biased toward the second integer sample.

For example, as part of operations of FIG. 2, video encoder 200 may determine respective distortion values associated with respective ones of a plurality of integer samples. The plurality of integer samples include the first integer sample 152A and the second integer sample 154A. To determine the first integer sample 152A, video encoder 200 may determine an integer sample associated with the lowest distortion value. That is, as described above, the distortion value for integer sample 152A may be less than the distortion value for other integer samples (of the integer sample search). To determine the second integer sample 154A, video encoder 200 may determine an integer sample among integer samples that neighbor the first integer sample 152A associated with the lowest distortion value. That is, the distortion value associated with second integer sample 154A may be less than the distortion value associated with any of the other integer samples shown in black that neighbor first integer sample 152A. As illustrated, the first integer sample 152A and the second integer sample 154A neighbor one another in the reference picture, and no other integer sample is between the first integer sample 152A and the second integer sample 154A in the reference picture.

In some examples, while determining the first integer sample 152A, video encoder 200 may have determined the distortion values associated with second integer sample 154A, as well as the other neighboring integer samples. In one or more examples, because the distortion values associated with second integer sample 154A and the other neighboring integer samples is already known, video encoder 200 may simply access memory for the respective distortion values to determine the second integer sample 154A. For instance, additional processing may not be needed to determine distortion values associated with the neighboring integer samples since the distortion values were already determined previously. Therefore, by accessing the memory, video encoder 200 may determine second integer sample 154A. Although described for FIG. 3A, the same applies for second integer sample 154B and 154C of FIGS. 3B and 3C, respectively.

As shown in FIG. 3A, the determined fractional samples (e.g., in hashes or diagonal lines) of the plurality of fractional samples are biased towards second integer sample 154A. For example, a majority of the determined fractional samples are formed within an area defined by first integer sample 152A as one corner of the area, and second integer sample 154A as an opposite corner of the area. In general, the first integer sample 152A and the second integer sample 154A (being diagonally neighboring integer sample) may define corners of an area between the first integer sample 152A and the second integer sample 154A, and there may be more determined fractional samples (e.g., those fractional samples for which distortion values are to be determined) within the area than outside the area.

Generally, in the present disclosure, a set of samples, e.g., the set of fractional samples or the set of fractional samples plus the determined integer sample (e.g., integer sample 152A in FIG. 3A), may be termed "biased" towards a neighboring integer sample (e.g., the second integer sample 154A in FIG. 3A) if the geometric center (i.e., centroid) of all samples of the set lies on the (e.g., diagonal) connection line of the determined integer sample and the neighboring integer sample. Similarly, a set of samples may be termed "biased" toward a first neighboring integer sample and a second neighboring integer sample (which itself is a neighboring integer sample of the first neighboring integer sample) if the geometric center of all samples of the set lies within the pie slice/circular segment formed by the connection lines of the determined integer sample with the respective first and second neighboring integer samples, but not on any of the connection lines themselves.

In accordance with one or more examples described in this disclosure, video encoder 200 may determine for which fractional samples of a plurality of fractional samples to determine respective distortion values based on integer sample 152A. For example, video encoder 200 may determine a set of fractional samples of a plurality of fractional samples for which to determine respective distortion values based on integer sample 152A. The determined fractional samples (e.g., the set of fractional samples) include at least a first fractional sample 156A having a first fractional pel resolution and a second fractional sample 158A having a second fractional pel resolution. For instance, for ease of visualization, fractional samples shown in hashes are quarter-pel resolution, and fractional samples shown in diagonal lines are half-pel resolution.

In one or more examples, video encoder 200 may determine (e.g., identify) the fractional samples for which video encoder 200 is to determine distortion values, and as illustrated, the determined (e.g., identified) fractional samples include fractional samples having different fractional pel resolutions. Video encoder 200 may determine (e.g., generate) the fractional samples as well, such as by interpolation. For example, subsequent to determining all of the fractional samples for which to determine the respective distortion values, video encoder 200 may determine the respective distortion values based on (e.g., associated with) the determined fractional samples. That is, subsequent to determining both the first fractional sample and the second fractional sample, video encoder 200 may determine the respective distortion values associated with the first fractional sample and the second fractional sample.

Video encoder 200 may determine (e.g., identify, select, compute, derive, etc.) the fractional samples in one stage. In general, video encoder 200 may determine all of the fractional samples for which distortion values are to be determined without any dependency upon determining some of the fractional samples. For instance, in some examples, all of the fractional samples shown in hashes or diagonal lines may form top-left samples of respective candidate reference blocks, and video encoder 200 may identify all of the fractional samples in one stage, rather than identifying some of the fractional samples, followed by identifying the other fractional samples based on the earlier identified fractional samples.

The above example is described with respect to FIG. 3A. Video encoder 200 may perform similar techniques with respect to FIGS. 3B and 3C. For instance, in FIG. 3B, video encoder 200 may determine the first integer sample 152B and the second integer sample 154B (e.g., neighboring sample having least distortion among neighboring samples) being diagonally offset to each other along the top-right diagonal. In this example, the fractional samples, including fractional sample 156B (quarter-pel) and fractional sample 158B (half-pel), are biased toward the integer sample 154B (i.e., the centroid of the illustrated set of fractional samples lies on the connection line between the first integer sample 152B and the second integer sample 154B).

In FIG. 3C, video encoder 200 may determine the first integer sample 152C and the second integer sample 154C (e.g., neighboring sample having least distortion among neighboring samples) being vertically offset to each other. In this example, the fractional samples, including fractional sample 156C (quarter-pel) and fractional sample 158C (half-pel), are biased toward the second integer sample 154C (i.e., the centroid of the illustrated set of fractional samples lies on the connection line between the first integer sample 152C and the second integer sample 154C). Correspondingly biased sets of fractional samples may be defined for other horizontal, vertical, or diagonal offsets/biases.

Figure 4A:
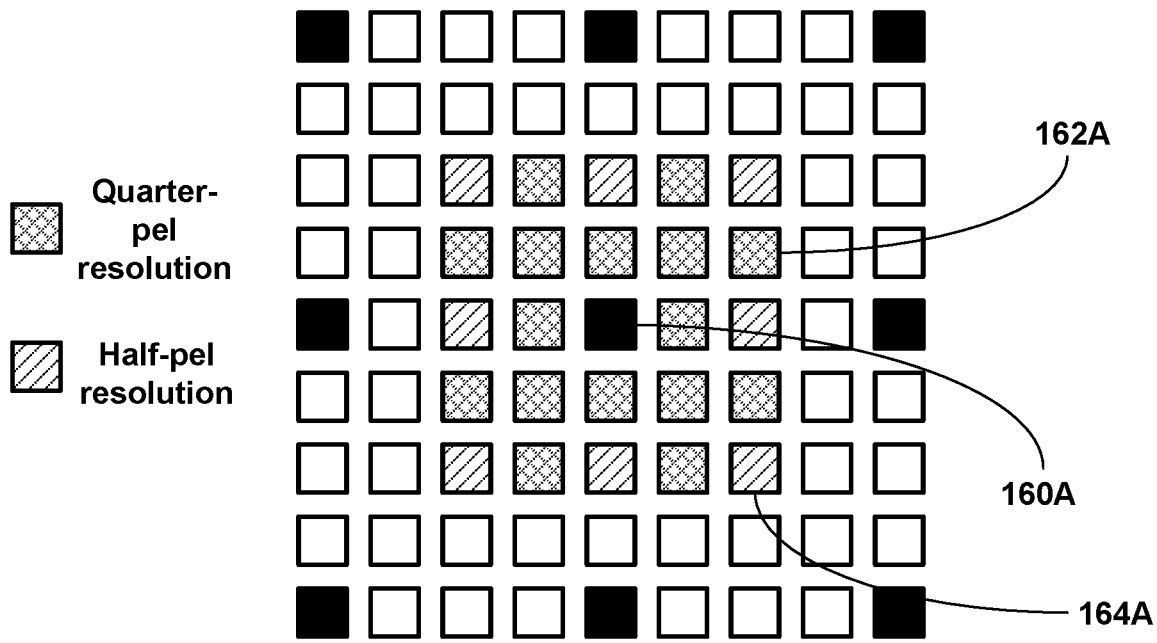
FIGS. 4A-4C are additional conceptual diagrams illustrating examples of fractional samples that are evaluated for selecting a reference block.
Figure 4B:
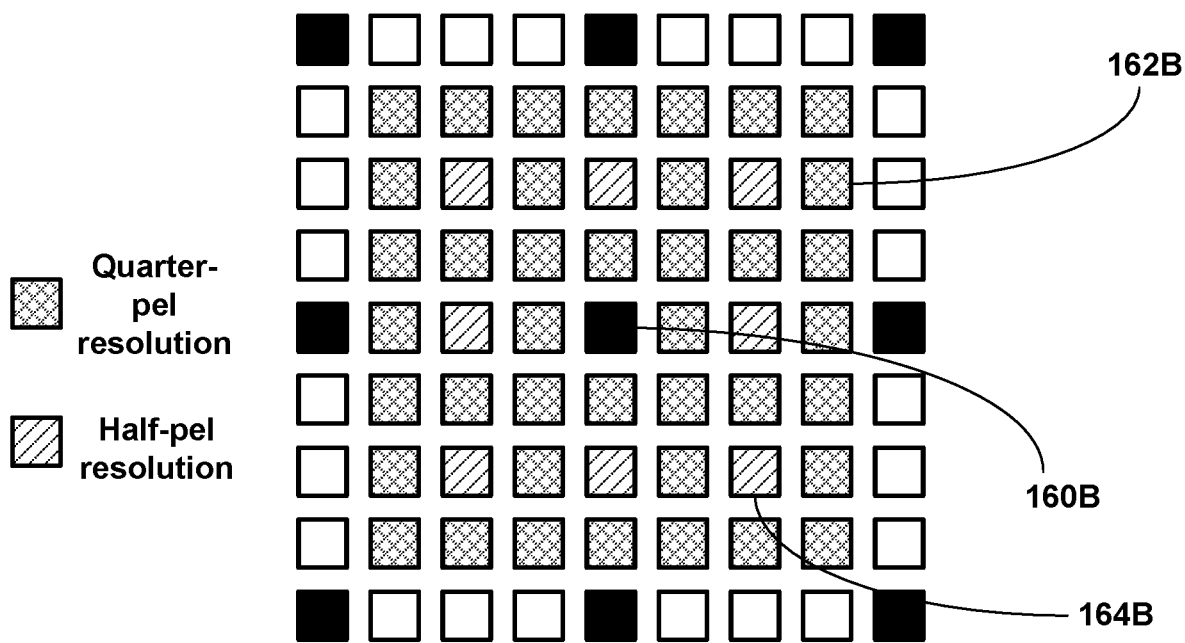
Figure 4C:
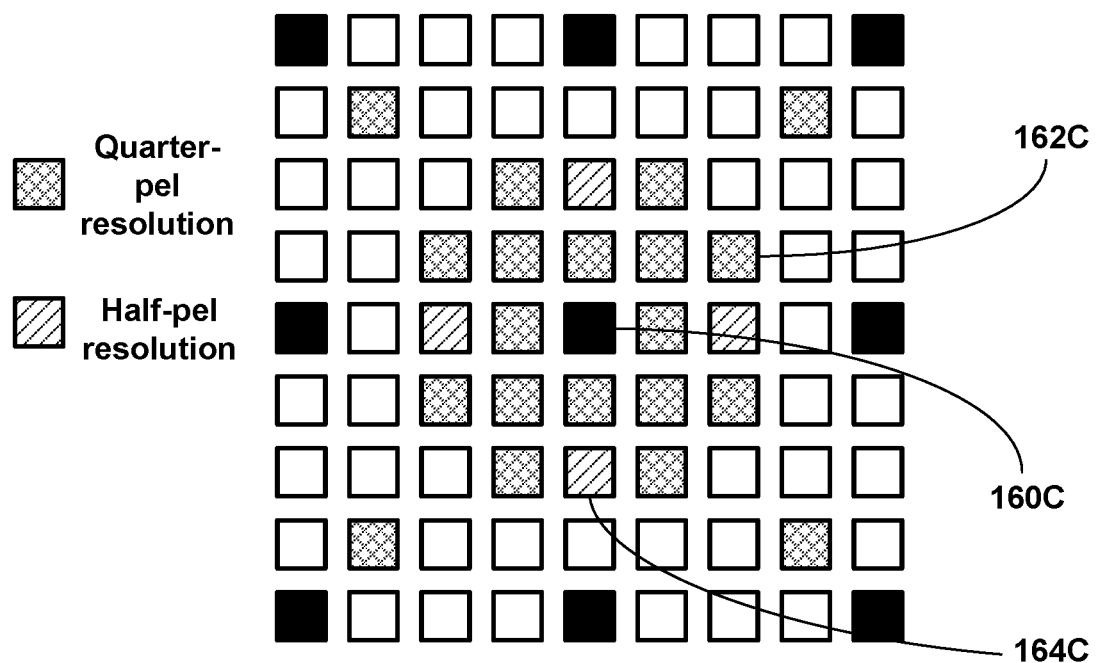

FIGS. 4A-4C are additional conceptual diagrams illustrating examples of fractional samples that are evaluated for selecting a reference block. FIGS. 4A-4C illustrate examples of video encoder 200 determining the plurality of fractional samples centered around the integer sample, i.e. the geometric center of the set consisting of the determined fractional samples coincides with the integer sample. For instance, in FIGS. 4A-4C, video encoder 200 may have determined, based on techniques described with respect to FIG. 2, that integer sample 160A, 160B, and 160C, respectively, is the "best" respective integer sample. In FIGS. 4A-4C, the fractional samples that video encoder 200 may determine in a single stage are illustrated using hashed or diagonal lines, and the integer samples are illustrated in black.

In one or more examples, video encoder 200 may determine the fractional samples from a plurality of fractional samples based on the integer sample 160A, 160B, or 160C. The determined fractional samples include at least a first fractional sample having a first fractional pel resolution and a second fractional sample having a second fractional pel resolution. For instance, in FIGS. 4A-4C, the determined fractional samples illustrated with diagonal lines are half-pel fractional samples, and the determined fractional samples illustrated with hashed lines are quarter-pel fractional samples. For instance, determined fractional samples 162A, 162B, and 162C in FIGS. 4A-4C respectively, are quarter-pel fractional samples, and determined fractional samples 164A, 164B, and 164C in FIGS. 4A-4C are half-pel fractional samples.

In the example of FIG. 4A, the number of determined fractional samples plus the determined integer sample is 25 (e.g., numFracPoints=5×5). In the example of FIG. 4B, the determined fractional samples are all of the fractional samples around integer sample 160B and between any of the other integer samples (e.g., within one pixel region).

In the example of FIG. 4C, the determined fractional samples may be based on the precision and distance to integer sample 160C. For instance, in FIG. 4C, numFracPoints equals 25, and the determined fractional samples include the 20 closest fractional samples, and 4 quarter-pel fractional samples. The example of FIG. 4C and FIG. 4A may be similar, expect in the example of FIG. 4C, four of the half-pel fractional samples are removed, relative to FIG. 4A, and four quarter-pel fractional samples are added next to integer samples. In some examples, numFracPoints includes the integer sample 160A, 160B, or 160C. In the present disclosure, the set consisting of the determined fractional samples may generally be extended to include the determined integer sample. As the distortion value for the determined integer sample has already been determined during the integer search, the integer sample may be added to the set consisting of the determined fractional samples without extra computational cost. Instead, the distortion value for the determined integer sample may be stored in the memory and read from the memory when determining the distortion values for the set of determined fractional samples.

In some examples, video encoder 200 may determine the plurality of fractional samples starting from fractional samples proximate to the integer sample (e.g., integer samples 152A, 152B, 152C, 160A, 160B, or 160C) until a number of the fractional samples is equal to a defined number of fractional samples (e.g., numFracPoints).

Figure 5:
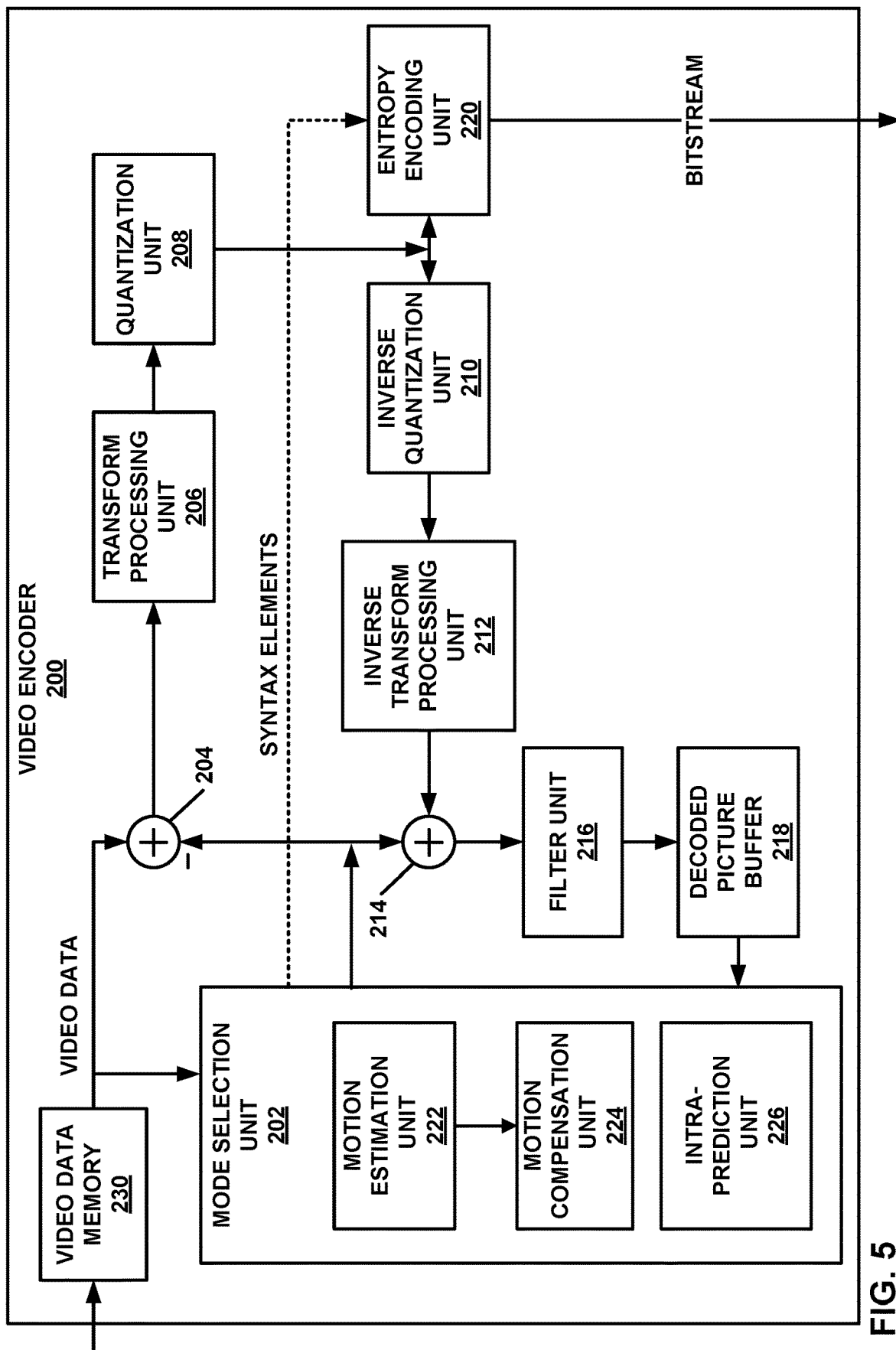
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC (ITU-T H.266), and HEVC (ITU-T H.265). However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute differences (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determining an integer sample in a reference picture based on a search area.

For instance, video encoder 200 may perform the example techniques of FIG. 2 to determine an integer sample in the reference picture, where FIG. 2 illustrates an example of the search area.

Motion estimation unit 222 and motion compensation unit 224 may determine for which fractional samples of a plurality of fractional samples to determine respective distortion values based on the integer sample. For example, motion estimation unit 222 and motion compensation unit 224 may determine a set of fractional samples of a plurality of fractional samples for which to determine respective distortion values based on the integer samples. The determined fractional samples (e.g., set of fractional samples) include at least a first fractional sample having a first fractional pel resolution and a second fractional sample having a second fractional pel resolution. The first fractional pel resolution is different than the second fractional pel resolution. Accordingly, motion estimation unit 222 and motion compensation unit 224 may determine, based on the integer sample, at least a first fractional sample and a second fractional sample that are used to determine respective distortion values, where the first fractional sample has a first fractional pel resolution, and the second fractional sample has a second fractional pel resolution different from the first fractional pel resolution. For instance, FIGS. 3A-3C and 4A-4C illustrate examples of the determined (e.g., identified) fractional samples of a plurality of fractional samples that include at least a first fractional sample having a first fractional pel resolution and a second fractional sample having a second fractional pel resolution.

As described above, in some examples, motion estimation unit 222 and motion compensation unit 224 may determine for which fractional samples of the plurality of fractional samples to determine respective distortion values in one stage (e.g., determine a set of fractional samples of the plurality of fractional samples). For example, motion estimation unit 222 and motion compensation unit 224 may determine respective distortion values based on the determined fractional samples (e.g., the determined set of fractional samples) in parallel. As described above, the determined fractional samples include fractional samples having different resolutions. For instance, motion estimation unit 222 and motion compensation unit 224 may determine a first distortion value based on the first fractional sample having the first fractional pel resolution, and determine a second distortion value based on the second fractional sample having the second fractional pel resolution in parallel with determining the first distortion value.

In one or more examples, subsequent to determining all of the fractional samples for which to determine the respective distortion values, motion estimation unit 222 and motion compensation unit 224 may determine the respective distortion values based on the determined fractional samples. For instance, subsequent to determining both the first fractional sample and the second fractional sample, motion estimation unit 222 and motion compensation unit 224 may determine the respective distortion values associated with the first fractional sample and the second fractional sample. For example, motion estimation unit 222 and motion compensation unit 224 may generate a plurality of candidate reference blocks based on the determined fractional samples, where each of the plurality of candidate reference blocks is generated based on a respective one of the determined fractional samples. Motion estimation unit 222 and motion compensation unit 224 may compare each of the plurality of candidate reference blocks to the current block (e.g., perform operations of an SAD or SATD). Motion estimation unit 222 and motion compensation unit 224 may determine the respective distortion values based on the comparison (e.g., the result of the SAD or the SATD may be the distortion values).

Motion estimation unit 222 and motion compensation unit 224 may determine a reference block for a current block (and a corresponding motion vector) based on at least one of the respective distortion values. For example, motion estimation unit 222 and motion compensation unit 224 may determine the distortion value having the lowest value (e.g., indicative of least distortion). Motion estimation unit 222 and motion compensation unit 224 may determine the candidate reference block associated with the lowest distortion value. Motion estimation unit 222 and motion compensation unit 224 may set the candidate reference block associated with the lowest distortion value as the reference block for the current block. For example, motion estimation unit 222 and motion compensation unit 224 may determine a distortion value, from among the respective distortion values, indicative of a lowest distortion amount with respect to the current block, and determine a candidate reference block associated with the determined distortion value. Motion estimation unit 222 and motion compensation unit 224 may determine the reference block based on the determined candidate reference block.

Motion estimation unit 222 and motion compensation unit 224 may encode the current block based on the reference block. For example, motion estimation unit 222 and motion compensation unit 224 may generate a prediction block based on the reference block (e.g., set the prediction block equal to the reference block or perform modifications to the reference block to generate the prediction block). Residual generation unit 204 may determine residual information indicative of a difference between the current block and the prediction block, and motion estimation unit 222 and motion compensation unit 224 determine a motion vector for the current block based on the reference block (e.g., the motion vector for the candidate reference block having the lowest distortion value). Motion estimation unit 222 and motion compensation unit 224, via entropy encoding unit 220, may signal information indicative of the residual information and information that video decoder 300 uses to derive the motion vector for the current block.

Figure 6:
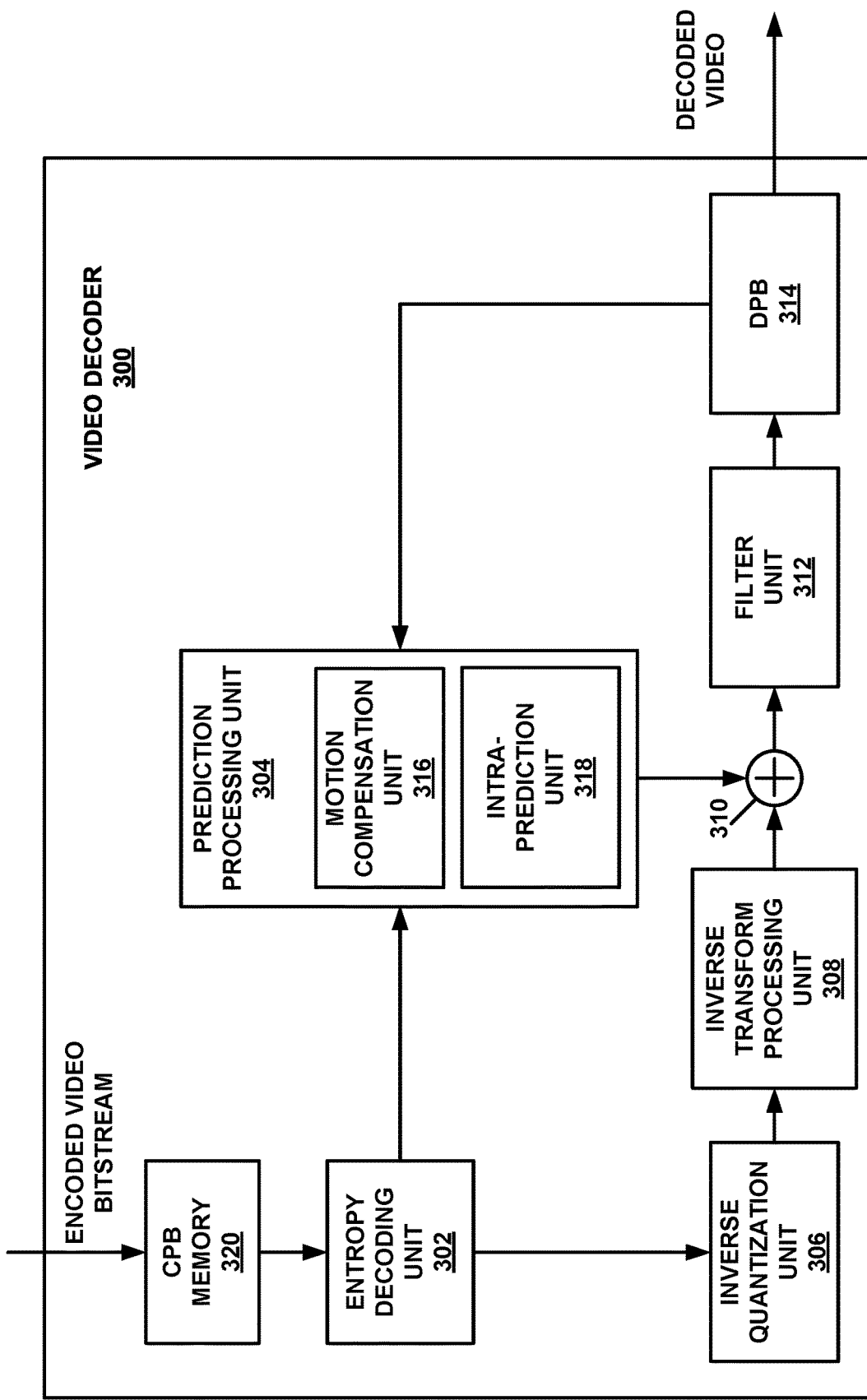
FIG. 6 is a block diagram illustrating an example video decoder that may perform the techniques of this disclosure.

FIG. 6 is a block diagram illustrating an example video decoder 300 that may perform the techniques of this disclosure. In one or more examples, video decoder 300 may receive signaling of residual information and information to derive the motion vector. The residual information and the information to derive the motion vector may be generated using the example techniques described in this disclosure that are implemented by video encoder 200.

FIG. 6 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Although various examples are described with respect to video encoder 200 performing example techniques described in this disclosure, the example techniques are not so limited. In some examples, video decoder 300 may be configured to perform the example techniques. For instance, video decoder 300 may be configured to perform the example techniques as part of decoder side motion vector refinement, or some other decoder side technique. Moreover, to determine cost metrics, video encoder 300 may determine cost metrics between candidate reference blocks and a block, such as a previously decoded block or a representation of the current block. For instance, video decoder 300 may receive residual data, and add the residual data to a previously decoded block to generate a representation of the current block. This representation of the current block may not be the actual the current block, but may instead by considered as a hypothesis of the current block. The previously decoded block or a representation of the current block (e.g., hypothesis of the current block) are provided as examples and should not be considered limiting.

As an example, video decoder 300 may be configured determine an integer sample in a reference picture of the video data, and determine, based on the integer sample, at least a first fractional sample and a second fractional sample, where the first fractional sample has a first fractional pel resolution, and the second fractional sample has a second fractional pel resolution different from the first fractional pel resolution.

In some examples, subsequent to determining both the first fractional sample and the second fractional sample, video decoder 300 may determine a first cost metric associated with the first fractional sample and a second cost metric associated with the second fractional sample. In one or more examples, to determine the first cost metric, video decoder 300 may generate a first candidate reference block based on the first fractional sample, and compare the first candidate reference block to a block (e.g., previously decoded block, representation of current block, etc.). Video decoder 300 may determine the first cost metric based on the comparison of the first candidate reference block the current block. To determine the second cost metric, video decoder 300 may generate a second candidate reference block based on the second fractional sample, compare the second candidate reference block to the block (e.g., previously decoded block, representation of current block, etc.). Video decoder 300 may determine the second cost metric based on the comparison of the first candidate reference block the current block.

Video decoder 300 may determine a reference block for a current block that is to be decoded based on at least one of the first cost metric or the second cost metric, and decode the current block based on the reference block. For instance, video decoder 300 may generate a prediction block based on the reference block, determine (e.g., receive) residual information indicative of a difference between the current block and the prediction block, and add the residual information to the prediction block to reconstruct the current block.

The various examples described with video encoder 200 may be applicable to video decoder 300, such as part of decoder side motion determination. For instance, to determine the cost metrics, since the current block may be unavailable at decoder side until the current block is reconstructed, video decoder 300 may utilize a previously decoded block, or a representation of the current block (e.g., summing the residual information to a candidate reference block), or possibly some other block generated from decoded data. Video decoder 300 may then perform various example techniques using the cost metrics as described with respect to video encoder 200. In this way, although the example techniques are described with respect to video encoder 200, the example techniques may be applicable to video decoder 300 as well.

Figure 7:
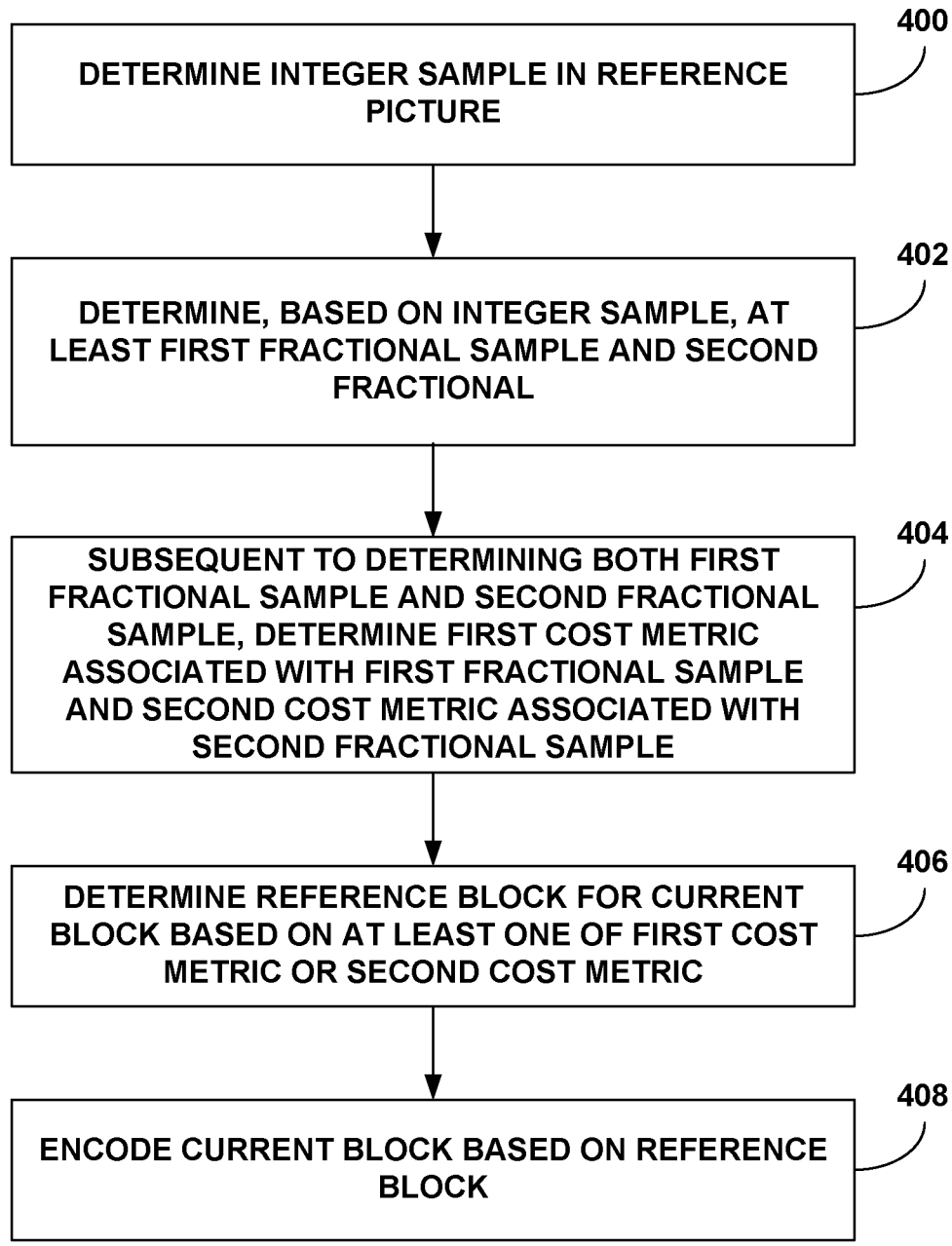
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may comprise a current CU. Although described with respect to video encoder 200 (FIGS. 1 and 5), it should be understood that other devices may be configured to perform a method similar to that of FIG. 7. FIG. 7 is described with the examples of FIGS. 3A-3C and 4A-4C for ease.

Video encoder 200 may determine an integer sample in a reference picture (400). In some examples, video encoder 200 may determine the integer sample in the reference picture based on a search area. One example of video encoder 200 determining an integer sample is illustrated in FIG. 2. As one example, video encoder 200 may start with an initial motion vector that identifies a first integer sample in the reference picture. For the first integer sample, video encoder 200 may generate a first candidate reference block of integer samples. Video encoder 200 may determine a first cost metric between the first candidate reference block of integer samples and the current block. Video encoder 200 may perform these same operations on a plurality of integer samples in the search area to determine respective cost metrics between respective candidate reference blocks of integer samples and the current block. Based on the cost metrics, video encoder 200 may determine the integer sample of the candidate reference block of integer samples having the lowest cost metric. Examples of the integer sample that video encoder 200 determines include integer samples 152A, 152B, and 152C of FIGS. 3A-3C, respectively, and integer samples 160A, 160B, and 160C of FIGS. 4A-4C, respectively.

Video encoder 200 may determine, based on the integer sample, at least a first fractional sample and a second fractional sample (e.g., that are used to determine respective cost metrics) (402). For example, video encoder 200 may determine for which fractional samples of a plurality of fractional samples to determine respective cost metrics based on the integer sample. As an example, video encoder 200 may determine a set of fractional samples of a plurality of fractional samples for which to determine respective cost metrics. The determined fractional samples (e.g., the determined set of fractional samples) include at least the first fractional sample having a first fractional pel resolution, and the second fractional sample having a second fractional pel resolution. The first fractional pel resolution is different than the second fractional pel resolution. In some examples, the first fractional pel resolution may be $\frac{1}{2}^N$ th-pel while the second fractional pel resolution is $\frac{1}{2}^{N+1st}$-pel where N is an integer larger than or equal to 1.

For example, FIGS. 3A-3C and 4A-4C illustrate examples of the determined fractional samples in hash or diagonal lines. Fractional samples 156A, 156B, and 156C in FIGS. 3A-3C or fractional samples 162A, 162B, and 162C in FIGS. 4A-4C are examples of the first fractional sample having the first fractional pel resolution (e.g., quarter-pel resolution). Fractional samples 158A, 158B, and 158C in FIGS. 3A-3C or fractional samples 164A, 164B, and 164C in FIGS. 4A-4C are examples of the second fractional sample having the second fractional pel resolution (e.g., half-pel resolution).

In one or more examples, video encoder 200 may determine (e.g., identify) the fractional samples in one stage (i.e., single stage). As described, a single stage refers to video encoder 200 determining (e.g., identifying) all of the fractional samples that are pointed to by respective motion vectors that are used for determining the reference block together. For instance, video encoder 200 may determine the fractional samples for which to determine the respective cost metrics (e.g., distortion values) in one stage by determining all of the fractional samples in parallel. As another example, video encoder 200 may determine the fractional samples in one stage by not waiting for the completion of determining one set of fractional samples before determining another set of fractional samples (i.e., there is no dependency between the determination of fractional samples).

For example, video encoder 200 may determine each of the respective cost metrics based on each of the determined fractional samples in parallel. As another example, video encoder 200 may determine a first cost metric based on the first fractional sample having the first fractional pel resolution, and determine a second cost metric based on the second fractional sample having the second fractional pel resolution in parallel with determining the first distortion value.

In some examples, to determine the plurality of fractional samples, video encoder 200 may interpolate the fractional samples from one or more integer samples in the reference picture. Determining the plurality of fractional samples may include determining one or more of half-pel samples, quarter-pel samples, eighth-pel samples, sixteenth-pel samples, thirty-second-pel samples, or sixty-fourth-pel samples, as a few examples.

Video encoder 200 may determine the fractional samples starting from fractional samples proximate to the integer sample and adding fractional samples with successively increasing distance from the integer sample until a number of the fractional samples is equal to a defined number of fractional samples (e.g., numFracPoints). However, the example techniques are not so limited. For example, as illustrated in FIGS. 4A-4C, video encoder 200 may determine the fractional samples that are centered around integer sample 160A, 160B, and 160C.

In some examples, such as in FIGS. 3A-3C, integer sample 152A, 152B, or 152C may be referred to as a first integer sample. Video encoder 200 may determine a second integer sample in the reference picture. To determine for which fractional samples of the plurality of fractional samples to determine respective cost metrics, video encoder 200 may determine the fractional samples for which to determine the respective cost metrics based on locations of the first integer sample and the second integer sample in the reference picture. A set consisting of the determined fractional samples may be biased toward the second integer sample or biased toward the second integer sample and a third integer sample which is a neighboring integer sample of the second integer sample as described above. That is, video encoder 200 may determine the first fractional sample and the second fractional sample that are used to determine respective cost metrics based on locations of the first integer sample and the second integer sample in the reference picture.

For example, in FIGS. 3A-3C, integer sample 154A, 154B, and 154C may be examples of the second integer sample. Video encoder 200 may identify the fractional samples illustrated in hashes and diagonal lines in FIGS. 3A-3C based on the location of the first integer sample and the second integer sample. For instance, the first integer sample and the second integer sample may form corners of an area, and a majority of the determined (e.g., identified) fractional samples may be within the area.

As described above with respect to FIGS. 3A-3C, video encoder 200 may be configured to determine respective distortion values associated with respective ones of a plurality of integer samples (e.g., the integer samples shown in black in FIGS. 3A-3C). The plurality of the integer samples includes the first integer sample and the second integer sample. In one or more examples, to determine the first integer sample, video encoder 200 may determine an integer sample associated with the lowest cost metric from among the plurality of integer samples. For example, the cost metric of integer samples 152A, 152B, and 152C, respectively, is the lowest from the plurality of integer samples in the search area. To determine the second integer sample, video encoder 200 may determine an integer sample among integer samples that neighbor the first integer sample associated with the lowest cost metric. For example, the cost metric of integer samples 154A, 154B, and 154C, respectively, is the lowest from the integer samples that neighbor integer samples 152A, 152B, and 152C, respectively. The first integer sample and the second integer sample neighbor one another in the reference picture, and no other integer sample is between the first integer sample and the second integer sample in the reference picture. The above describes examples using cost metric or cost metrics, examples of which include a distortion value or distortion values.

Subsequent to determining both the first fractional sample and the second fractional sample, video encoder 200 may determine a first cost metric associated with the first fractional sample and a second cost metric associated with the second fractional sample (404). For instance, subsequent to determining all of the fractional samples (e.g., for which to determine the respective cost metrics), video encoder 200 may determine respective cost metrics associated with the determined fractional samples.

There may be various ways in which video encoder 200 may determine respective cost metrics. As described, distortion values are an example of the cost metrics, and the cost metrics may be indicative of distortion. However, the example techniques are not so limited. Cost metrics need not necessarily be considered as being indicative of distortion.

As one example, video encoder 200 may generate a plurality of candidate reference blocks based on the determined fractional samples, where each of the plurality of candidate reference block is generated based on each of the determined fractional samples. Video encoder 200 may compare each of the plurality of candidate reference blocks to the current block (e.g., by performing SAD or SATD calculations). SAD and SATD calculations are example ways of determining the cost metric. Video encoder 200 may determine the respective cost metrics based on the comparison (e.g., the cost metrics are the result of the SAD or SATD).

Video encoder 200 may determine a reference block for the current block based on at least one of the first cost metric or the second cost metric (406). For example, video encoder 200 may determine which candidate reference block had the smallest cost metric (e.g., distortion value), and video encoder 200 may select that candidate reference block as the reference block for the current block. For example, video encoder 200 may determine a cost metric, from among the respective cost metrics, indicative of a lowest distortion amount with respect to the current block, and determine a candidate reference block associated with the determined cost metric. Video encoder 200 may determine the reference block based on the determined candidate reference block and the candidate reference block associated with the determined integer sample.

Video encoder 200 may encode the current block based on the reference block (408). For example, video encoder 200 may generate a prediction block based on the reference block, determine residual information indicative of a difference between the current block and the prediction block, and determine a motion vector for the current block based on the reference block. Video encoder 200 may signal information indicative of the residual information and information that a video decoder uses to derive the motion vector for the current block.

The following describes one or more examples described in this disclosure.

Clause 1. A method of encoding video data, the method comprising: determining an integer sample in a reference picture of the video data; determining, based on the integer sample, at least a first fractional sample and a second fractional sample, wherein the first fractional sample has a first fractional pel resolution, and the second fractional sample has a second fractional pel resolution different from the first fractional pel resolution; subsequent to determining both the first fractional sample and the second fractional sample, determining a first cost metric associated with the first fractional sample and a second cost metric associated with the second fractional sample; determining a reference block for a current block based on at least one of the first cost metric or the second cost metric; and encoding the current block based on the reference block.

Clause 2. The method of clause 1, wherein determining the reference block comprises determining the reference block for the current block based on at least one of the first cost metric or the second cost metric, and a cost metric associated with the integer sample.

Clause 3. The method of any of clauses 1 and 2, wherein the first fractional pel resolution is a $\frac{1}{2^N}$th-pel resolution and the second fractional pel resolution is a $\frac{1}{2^{N+1st}}$-pel resolution with N being an integer larger than or equal to 1.

Clause 4. The method of any of clauses 1-3, wherein the first cost metric and the second cost metric are cost metrics of a plurality of cost metrics, the method further comprising: determining a cost metric, from among the plurality of cost metrics, indicative of a lowest cost metric with respect to the current block, wherein the determined cost metric comprises one of the first cost metric or the second cost metric; and determining a candidate reference block associated with the determined cost metric, wherein determining the reference block comprises determining the reference block based on the determined candidate reference block.

Clause 5. The method of any of clauses 1-4, wherein determining at least the first fractional sample and the second fractional sample comprises identifying a set of fractional samples, wherein the set of fractional samples include the first fractional sample and the second fractional sample, and wherein subsequent to determining both the first fractional sample and the second fractional sample, determining the first cost metric associated with the first fractional sample and the second cost metric associated with the second fractional sample comprises subsequent to identifying all of the fractional samples in the set of fractional samples, determining a respective cost metric associated with each of the set of fractional samples.

Clause 6. The method of clause 5, wherein determining respective cost metrics associated with each of the set of fractional samples comprises determining the respective cost metrics associated with each of the set of fractional samples at least partly in parallel.

Clause 7. The method of any of clauses 1-6, wherein determining the first cost metric associated with the first fractional sample and the second cost metric associated with the second fractional sample comprises: determining the first cost metric associated with the first fractional sample having the first fractional pel resolution; and determining the second cost metric associated with the second fractional sample having the second fractional pel resolution at least partly in parallel with determining the first cost metric.

Clause 8. The method of any of clauses 1-7, wherein determining, based on the integer sample, at least the first fractional sample and the second fractional sample comprises determining the first fractional sample and the second fractional sample in one stage.

Clause 9. The method of any of clauses 1-8, wherein the integer sample is a first integer sample, the method further comprising: determining a second integer sample in the reference picture, wherein determining the first fractional sample and the second fractional sample comprises determining the first fractional sample and the second fractional sample based on locations of the first integer sample and the second integer sample in the reference picture.

Clause 10. The method of clause 9, further comprising: determining respective cost metrics associated with respective ones of a plurality of integer samples, wherein the plurality of the integer samples includes the first integer sample and the second integer sample, wherein determining the first integer sample comprises determining an integer sample associated with the lowest cost metric from among the plurality of integer samples, and wherein determining the second integer sample comprises determining an integer sample among integer samples that neighbor the first integer sample associated with the lowest cost metric.

Clause 11. The method of any of clauses 9 and 10, wherein the first integer sample and the second integer sample neighbor one another in the reference picture, and no other integer sample is between the first integer sample and the second integer sample in the reference picture.

Clause 12. The method of any of clauses 9-11, wherein determining at least the first fractional sample and the second fractional sample comprises identifying a set of fractional samples, wherein the set of fractional samples include the first fractional sample and the second fractional sample, and wherein identifying the set of fractional samples comprises identifying the set of fractional samples having a geometric center biased toward the second integer sample.

Clause 13. The method of any of clauses 1-8, wherein determining at least the first fractional sample and the second fractional sample comprises identifying a set of fractional samples, wherein the set of fractional samples include the first fractional sample and the second fractional sample, and wherein identifying the set of fractional samples comprises identifying the set of fractional samples that are centered around the integer sample.

Clause 14. The method of any of clauses 1-8 and 13, wherein determining at least the first fractional sample and the second fractional sample comprises identifying a set of fractional samples, wherein the set of fractional samples include the first fractional sample and the second fractional sample, and wherein identifying the set of fractional samples comprises identifying the set of fractional samples starting from fractional samples proximate to the integer sample and adding fractional samples with successively increasing distance from the integer sample until a number of the fractional samples is equal to a defined number of fractional samples.

Clause 15. The method of any of clauses 1-14, wherein determining at least the first fractional sample and the second fractional sample comprises: determining the first fractional sample having the first fractional pel resolution of half-pel, quarter-pel, eighth-pel, sixteenth-pel, thirty-second-pel, or sixty-fourth-pel; and determining the second fractional sample having the second fractional pel resolution of another one of half-pel, quarter-pel, eighth-pel, sixteenth-pel, thirty-second-pel, or sixty-fourth-pel.

Clause 16. The method of any of clauses 1-15, wherein determining a first cost metric associated with the first fractional sample and a second cost metric associated with the second fractional sample comprises: generating a first candidate reference block based on the first fractional sample; comparing the first candidate reference block to the current block; determining the first cost metric based on the comparison of the first candidate reference block the current block; generating a second candidate reference block based on the second fractional sample; comparing the second candidate reference block to the current block; and determining the second cost metric based on the comparison of the first candidate reference block the current block.

Clause 17. The method of any of clauses 1-16, wherein encoding the current block based on the reference block comprises: generating a prediction block based on the reference block; determining residual information indicative of a difference between the current block and the prediction block; determining a motion vector for the current block based on the reference block; and signaling information indicative of the residual information and information that a video decoder uses to derive the motion vector for the current block.

Clause 18. A device for encoding video data, the device comprising: memory configured to store video data; and one or more processors implemented in circuitry, coupled to the memory, and configured to: determine an integer sample in a reference picture of the video data; determine, based on the integer sample, at least a first fractional sample and a second fractional sample, wherein the first fractional sample has a first fractional pel resolution, and the second fractional sample has a second fractional pel resolution different from the first fractional pel resolution; subsequent to determining both the first fractional sample and the second fractional sample, determine a first cost metric associated with the first fractional sample and a second cost metric associated with the second fractional sample; determine a reference block for a current block based on at least one of the first cost metric or the second cost metric; and encode the current block based on the reference block.

Clause 19. The device of clause 18, wherein to determine the reference block, the one or more processors are configured to determine the reference block for the current block based on at least one of the first cost metric or the second cost metric, and a cost metric associated with the integer sample.

Clause 20. The device of any of clauses 18 and 19, wherein the first fractional pel resolution is a $\frac{1}{2}^N$th-pel resolution and the second fractional pel resolution is a $\frac{1}{2}^{N+1 st}$-pel resolution with N being an integer larger than or equal to 1.

Clause 21. The device of any of clauses 18-20, wherein the first cost metric and the second cost metric are cost metrics of a plurality of cost metrics, and wherein the one or more processors are configured to: determine a cost metric, from among the plurality of cost metrics, indicative of a lowest cost metric with respect to the current block, wherein the determined cost metric comprises one of the first cost metric or the second cost metric; and determine a candidate reference block associated with the determined cost metric, wherein to determine the reference block, the one or more processors are configured to determine the reference block based on the determined candidate reference block.

Clause 22. The device of any of clauses 18-21, wherein to determine at least the first fractional sample and the second fractional sample, the one or more processors are configured to identify a set of fractional samples, wherein the set of fractional samples include the first fractional sample and the second fractional sample, and wherein, subsequent to determining both the first fractional sample and the second fractional sample, to determine the first cost metric associated with the first fractional sample and the second cost metric associated with the second fractional sample, the one or more processors are configured to, subsequent to identifying all of the fractional samples in the set of fractional samples, determine a respective cost metric associated with each of the set of fractional samples.

Clause 23. The device of clause 22, wherein to determine respective cost metrics associated with each of the set of fractional samples, the one or more processors are configured to determine the respective cost metrics associated with each of the set of fractional samples at least partly in parallel.

Clause 24. The device of any of clauses 18-23, wherein to determine the first cost metric associated with the first fractional sample and the second cost metric associated with the second fractional sample, the one or more processors are configured to: determine the first cost metric associated with the first fractional sample having the first fractional pel resolution; and determine the second cost metric associated with the second fractional sample having the second fractional pel resolution at least partly in parallel with determining the first cost metric.

Clause 25. The device of any of clauses 18-24, wherein to determine, based on the integer sample, at least the first fractional sample and the second fractional sample, the one or more processors are configured to determine the first fractional sample and the second fractional sample in one stage.

Clause 26. The device of any of clause 18-25, wherein the integer sample is a first integer sample, and wherein the one or more processors are configured to: determine a second integer sample in the reference picture, wherein to determine the first fractional sample and the second fractional sample, the one or more processors are configured to determine the first fractional sample and the second fractional sample based on locations of the first integer sample and the second integer sample in the reference picture.

Clause 27. The device of clause 26, wherein the one or more processors are configured to: determine respective cost metrics associated with respective ones of a plurality of integer samples, wherein the plurality of the integer samples includes the first integer sample and the second integer sample, wherein to determine the first integer sample, the one or more processors are configured to determine an integer sample associated with the lowest cost metric from among the plurality of integer samples, and wherein to determine the second integer sample, the one or more processors are configured to determine an integer sample among integer samples that neighbor the first integer sample associated with the lowest cost metric.

Clause 28. The device of any of clauses 26 and 27, wherein the first integer sample and the second integer sample neighbor one another in the reference picture, and no other integer sample is between the first integer sample and the second integer sample in the reference picture.

Clause 29. The device of any of clauses 26-28, wherein to determine at least the first fractional sample and the second fractional sample, the one or more processors are configured to identify a set of fractional samples, wherein the set of fractional samples include the first fractional sample and the second fractional sample, and wherein to identify the set of fractional samples, the one or more processors are configured to identify the set of fractional samples having a geometric center biased toward the second integer sample.

Clause 30. The device of any of clauses 18-25, wherein to determine at least the first fractional sample and the second fractional sample, the one or more processors are configured to identify a set of fractional samples, wherein the set of fractional samples include the first fractional sample and the second fractional sample, and wherein to identify the set of fractional samples, the one or more samples are configured to identify the set of fractional samples that are centered around the integer sample.

Clause 31. The device of any of clauses 18-25 and 30, wherein to determine at least the first fractional sample and the second fractional sample, the one or more processors are configured to identify a set of fractional samples, wherein the set of fractional samples include the first fractional sample and the second fractional sample, and wherein to identify the set of fractional samples, the one or more processors are configured to identify the set of fractional samples starting from fractional samples proximate to the integer sample and adding fractional samples with successively increasing distance from the integer sample until a number of the fractional samples is equal to a defined number of fractional samples.

Clause 32. The device of any of clauses 18-31, wherein to determine at least the first fractional sample and the second fractional sample, the one or more processors are configured to: determine the first fractional sample having the first fractional pel resolution of half-pel, quarter-pel, eighth-pel, sixteenth-pel, thirty-second-pel, or sixty-fourth-pel; and determine the second fractional sample having the second fractional pel resolution of another one of half-pel, quarter-pel, eighth-pel, sixteenth-pel, thirty-second-pel, or sixty-fourth-pel.

Clause 33. The device of any of clauses 18-32, wherein to determine a first cost metric associated with the first fractional sample and a second cost metric associated with the second fractional sample, the one or more processors are configured to: generate a first candidate reference block based on the first fractional sample; compare the first candidate reference block to the current block; determine the first cost metric based on the comparison of the first candidate reference block the current block; generate a second candidate reference block based on the second fractional sample; compare the second candidate reference block to the current block; and determine the second cost metric based on the comparison of the first candidate reference block the current block.

Clause 34. The device of any of clauses 18-33, wherein to encode the current block based on the reference block, the one or more processors are configured to: generate a prediction block based on the reference block; determine residual information indicative of a difference between the current block and the prediction block; determine a motion vector for the current block based on the reference block; and signal information indicative of the residual information and information that a video decoder uses to derive the motion vector for the current block.

Clause 35. A computer-readable storage medium storing instructions thereon that when executed cause one or more processors to: determine an integer sample in a reference picture of the video data; determine, based on the integer sample, at least a first fractional sample and a second fractional sample, wherein the first fractional sample has a first fractional pel resolution, and the second fractional sample has a second fractional pel resolution different from the first fractional pel resolution; subsequent to determining both the first fractional sample and the second fractional sample, determine a first cost metric associated with the first fractional sample and a second cost metric associated with the second fractional sample; determine a reference block for a current block based on at least one of the first cost metric or the second cost metric; and encode the current block based on the reference block.

Clause 36. The computer-readable storage medium of clause 31, further comprising instructions that cause the one or more processors to perform the operations of any of clauses 2-17.

Clause 37. A device for encoding video data, the device comprising: means for determining an integer sample in a reference picture of the video data; means for determining, based on the integer sample, at least a first fractional sample and a second fractional sample, wherein the first fractional sample has a first fractional pel resolution, and the second fractional sample has a second fractional pel resolution different from the first fractional pel resolution; means for, subsequent to determining both the first fractional sample and the second fractional sample, determining a first cost metric associated with the first fractional sample and a second cost metric associated with the second fractional sample; means for determining a reference block for a current block based on at least one of the first cost metric or the second cost metric; and means for encoding the current block based on the reference block.

Clause 38. The device of clause 37, further comprising means for performing the operations of any of clauses 2-17.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   determining a first integer sample in a reference picture of the video data;
   determining a second integer sample in the reference picture of the video data;
   identifying, in parallel and based on a first location of the first integer sample and a second location of the second integer sample in the reference picture, fractional samples starting from fractional samples proximate to the first integer sample and adding fractional samples with successively increasing distance from the first integer sample until a number of the fractional samples is equal to a defined number of fractional samples to determine a first plurality of fractional samples and a second plurality of fractional samples, wherein each fractional sample among the first plurality of fractional samples has a first fractional pel resolution, and each fractional sample among the second plurality of fractional samples has a second fractional pel resolution different from the first fractional pel resolution;
   subsequent to the parallel determination of the first plurality of fractional samples and the second plurality of fractional samples, determining, in parallel, a respective cost metric for each fractional sample among the first plurality of fractional samples and a respective cost metric for each fractional sample among the second plurality of fractional samples, where each cost metric is indicative of a respective difference between a respective candidate reference block and a current block;
   determining, based the respective cost metrics associated with the first plurality of fractional samples and the respective cost metrics associated with the second plurality of fractional samples, a reference block for a current block; and
   encoding the current block based on the reference block.

2. The method of claim 1, further comprising determining the reference block for the current block based on the respective cost metrics for the first plurality of samples, the respective cost metrics for the second plurality of samples, and a cost metric associated with at least the first integer sample.

3. The method of claim 1, wherein the first fractional pel resolution is a $\frac{1}{2^N}$th-pel resolution and the second fractional pel resolution is a $\frac{1}{2^{N+1st}}$-pel resolution with N being an integer larger than or equal to 1.

4. The method of claim 1, further comprising:
   determining, from among the respective cost metrics associated with the first plurality of fractional samples and the respective cost metrics associated with the second plurality of fractional samples, a smallest cost metric having a smallest value; and
   determining a candidate reference block associated with the smallest cost metric, wherein determining the reference block comprises determining the reference block based on the determined candidate reference block.

5. The method of claim 1, wherein determining, in parallel and based on the first integer sample and the second integer sample, the first plurality of fractional samples and the second plurality of fractional samples, comprises the first plurality of fractional samples and the second plurality of fractional samples in one stage.

6. The method of claim 1, further comprising:
determining respective cost metrics associated with each integer sample of a plurality of integer samples, wherein the plurality of the integer samples includes the first integer sample and the second integer sample,
wherein determining the first integer sample comprises determining an integer sample associated with a lowest cost metric from among the respective cost metrics associated with the plurality of integer samples, and
wherein determining the second integer sample comprises determining an integer sample, from among integer samples that neighbor the first integer sample, associated with a lowest cost metric.

7. The method of claim 1, wherein the first integer sample and the second integer sample neighbor one another in the reference picture, and no other integer sample is between the first integer sample and the second integer sample in the reference picture.

8. The method of claim 1, wherein determining the first plurality of fractional samples and the second plurality of fractional samples comprises identifying fractional samples having a geometric center biased toward the second integer sample.

9. The method of claim 1, wherein each fractional sample of the first plurality of fractional samples has the first fractional pel resolution of half-pel, quarter-pel, eighth-pel, sixteenth-pel, thirty-second-pel, or sixty-fourth-pel, and each fractional sample of the second plurality of fractional samples has the second fractional pel resolution of another one of half-pel, quarter-pel, eighth-pel, sixteenth-pel, thirty-second-pel, or sixty-fourth-pel.

10. The method of claim 1, wherein determining the respective cost metrics associated with the first plurality of fractional samples and the respective cost metrics associated with the second plurality of fractional samples comprises:
generating the respective candidate reference block based on each fractional sample of the first plurality of fractional samples and each fractional sample of the second plurality of fractional samples;
comparing each respective candidate reference block to the current block; and
determining each respective cost metric based on each respective comparison.

11. The method of claim 1, wherein encoding the current block based on the reference block comprises:
generating a prediction block based on the reference block;
determining residual information indicative of a difference between the current block and the prediction block;
determining a motion vector for the current block based on the reference block; and
signaling information indicative of the residual information and information that a video decoder uses to derive the motion vector for the current block.

12. A device for encoding video data, the device comprising:
memory configured to store video data; and
one or more processors implemented in circuitry, coupled to the memory, and configured to:
determine a first integer sample in a reference picture of the video data;
determine a second integer sample in the reference picture of the video data;
identify, in parallel and based on a first location of the first integer sample and a second location of the second integer sample in the reference picture, fractional samples starting from fractional samples proximate to the first integer sample and add fractional samples with successively increasing distance from the first integer sample until a number of the fractional samples is equal to a defined number of fractional samples to determine a first plurality of fractional samples and a second plurality of fractional samples, wherein each fractional sample among the first plurality of fractional samples has a first fractional pel resolution, and each fractional sample among the second plurality of fractional samples has a second fractional pel resolution different from the first fractional pel resolution;
subsequent to the parallel determination of the first plurality of fractional samples and the second plurality of fractional samples, determine, in parallel, a respective cost metric for each fractional sample among the first plurality of fractional samples and a respective cost metric for each fractional sample among the second plurality of fractional samples, where each cost metric is indicative of a respective difference between a respective candidate reference block and a current block;
determine, based the respective cost metrics associated with the first plurality of fractional samples and the respective cost metrics associated with the second plurality of fractional samples, a reference block for a current block; and
encode the current block based on the reference block.

13. The device of claim 12, wherein the one or more processors are configured to determine the reference block for the current block based on the respective cost metrics for the first plurality of samples, the respective cost metrics for the second plurality of samples, and a cost metric associated with at least the first integer sample.

14. The device of claim 12, wherein the first fractional pel resolution is a $\frac{1}{2^N}$th-pel resolution and the second fractional pel resolution is a $\frac{1}{2^{N+1st}}$-pel resolution with N being an integer larger than or equal to 1.

15. The device of claim 12, wherein the one or more processors are configured to:
determine, from among the respective cost metrics associated with the first plurality of fractional samples and the respective cost metrics associated with the second plurality of fractional samples, a smallest cost metric having a smallest value; and
determine a candidate reference block associated with the smallest cost metric,
wherein to determine the reference block, the one or more processors are configured to determine the reference block based on the determined candidate reference block.

16. The device of claim 12, wherein to determine, in parallel and based on the first integer sample and the second integer sample, the first plurality of fractional samples and the second plurality of fractional samples, the one or more processors are configured to determine the first plurality of fractional samples and the second plurality of fractional samples in one stage.

17. The device of claim 12, wherein the one or more processors are configured to:
  determine respective cost metrics associated with each integer sample of a plurality of integer samples, wherein the plurality of the integer samples includes the first integer sample and the second integer sample,
  wherein to determine the first integer sample, the one or more processors are configured to determine an integer sample associated with a lowest cost metric from among the respective cost metrics associated with the plurality of integer samples, and
  wherein to determine the second integer sample, the one or more processors are configured to determine an integer sample, from among integer samples that neighbor the first integer sample, associated with a lowest cost metric.

18. The device of claim 12, wherein the first integer sample and the second integer sample neighbor one another in the reference picture, and no other integer sample is between the first integer sample and the second integer sample in the reference picture.

19. The device of claim 12,
  wherein to determine the first plurality of fractional samples and the second plurality of fractional samples, the one or more processors are configured to identify fractional samples having a geometric center biased toward the second integer sample.

20. The device of claim 12, wherein each fractional sample of the first plurality of fractional samples has the first fractional pel resolution of half-pel, quarter-pel, eighth-pel, sixteenth-pel, thirty-second-pel, or sixty-fourth-pel, and each fractional sample of the second plurality of fractional samples has the second fractional pel resolution of another one of half-pel, quarter-pel, eighth-pel, sixteenth-pel, thirty-second-pel, or sixty-fourth-pel.

21. The device of claim 12, wherein to determine the respective cost metrics associated with the first plurality of fractional samples and the respective cost metrics associated with the second plurality of fractional samples, the one or more processors are configured to:
  generate the respective candidate reference block based on each fractional sample of the first plurality of fractional samples and each fractional sample of the second plurality of fractional samples;
  compare each respective candidate reference block to the current block; and
  determine each respective cost metric based on each respective comparison.

22. The device of claim 12, wherein to encode the current block based on the reference block, the one or more processors are configured to:
  generate a prediction block based on the reference block;
  determine residual information indicative of a difference between the current block and the prediction block;
  determine a motion vector for the current block based on the reference block; and
  signal information indicative of the residual information and information that a video decoder uses to derive the motion vector for the current block.

23. A non-transitory, computer-readable storage medium storing instructions thereon that when executed cause one or more processors to:
  determine a first integer sample in a reference picture of video data;
  determine a second integer sample in the reference picture of the video data;
  identify, in parallel and based on a first location of the first integer sample and a second location of the second integer sample in the reference picture, fractional samples starting from fractional samples proximate to the first integer sample and add fractional samples with successively increasing distance from the first integer sample until a number of the fractional samples is equal to a defined number of fractional samples to determine a first plurality of fractional samples and a second plurality of fractional samples, each fractional sample among the first plurality of fractional samples has a first fractional pel resolution, and each fractional sample among the second plurality of fractional samples has a second fractional pel resolution different from the first fractional pel resolution;
  subsequent to the parallel determination of the first plurality of fractional samples and the second plurality of fractional samples, determine, in parallel, a respective cost metric for each fractional sample among the first plurality of fractional samples and a respective cost metric for each fractional sample among the second plurality of fractional samples, where each cost metric is indicative of a respective difference between a respective candidate reference block and a current block;
  determine, based the respective cost metrics associated with the first plurality of fractional samples and the respective cost metrics associated with the second plurality of fractional samples, a reference block for a current block; and
  encode the current block based on the reference block.

24. A device for encoding video data, the device comprising:
  means for determining a first integer sample in a reference picture of the video data;
  means for determining a second integer sample in the reference picture of the video data;
  means for identifying, in parallel and based on a first location of the first integer sample a second location of the second integer sample in the reference picture, a first plurality of fractional samples and a second plurality of fractional samples, fractional samples starting from fractional samples proximate to the first integer sample and means for adding fractional samples with successively increasing distance from the first integer sample until a number of the fractional samples is equal to a defined number of fractional samples to determine wherein each fractional sample among the plurality of fractional samples has a first fractional pel resolution, and each fractional sample among the second plurality of fractional samples has a second fractional pel resolution different from the first fractional pel resolution;
  means for, subsequent to the parallel determination of the first plurality of fractional samples and the second plurality of fractional samples, determining, in parallel, a respective cost metric for each fractional sample among the first plurality of fractional samples and a respective cost metric for each fractional sample among the second plurality of fractional samples, where each cost metric is indicative of a respective difference between a respective candidate reference block and a current block;
  means for determining, based the respective cost metrics associated with the first plurality of fractional samples and the respective cost metrics associated with the second plurality of fractional samples, a reference block for a current block; and means for encoding the current block based on the reference block.

\* \* \* \* \*